US 6,794,842 B2

(12) United States Patent
Sano

(10) Patent No.: US 6,794,842 B2
(45) Date of Patent: Sep. 21, 2004

(54) SERVOMOTOR DRIVE CONTROL SYSTEM

(75) Inventor: Shuya Sano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/220,644

(22) PCT Filed: Dec. 19, 2000

(86) PCT No.: PCT/JP00/08969

§ 371 (c)(1),
(2), (4) Date: Sep. 4, 2002

(87) PCT Pub. No.: WO02/052715

PCT Pub. Date: Jul. 7, 2002

(65) Prior Publication Data

US 2003/0137270 A1 Jul. 24, 2003

(51) Int. Cl.⁷ .............................................. G05B 19/10
(52) U.S. Cl. ........................ 318/567; 318/560; 318/569
(58) Field of Search ................................ 318/560, 567, 318/569

(56) References Cited

U.S. PATENT DOCUMENTS 6,164,947 A * 12/2000 Miyahara ..................... 425/136
6,279,673 B1 * 8/2001 Bohner et al. ............... 180/167

* cited by examiner

Primary Examiner—Karen Masih
(74) Attorney, Agent, or Firm—Sughrue Mion, PLLC

(57) ABSTRACT

In a servomotor drive control system comprising a command unit such as a numerical control unit, a plurality of drive control units for controlling drive of servomotors, a first communication line for transmitting data such as a control command, in a direction of the above-mentioned plurality of drive control units from the above-mentioned command unit, and a second communication line for transmitting data such as detection data, in a direction of the above-mentioned command unit from the above-mentioned plurality of drive control units, wherein data is transferred between the above-mentioned plurality of drive control units using the above-mentioned communication lines, whereby the above-mentioned servomotors are synchronously controlled, the communication period between the above-mentioned drive control units is set to one-nth of the communication period of the above-mentioned command unit (n is an integer).

8 Claims, 16 Drawing Sheets

SERVOMOTOR DRIVE CONTROL SYSTEM

TECHNICAL FIELD

This invention relates to a servomotor drive control system for performing high-speed and high-accuracy synchronous operation between drive control units by optimized communications and inputting sensor information and performing high-response and high-accuracy machine control.

BACKGROUND OF THE INVENTION

FIG. 14 is a block diagram of a numerical control system in a related art, a kind of servomotor drive control system, for controlling drive control units by a numerical control unit of a command unit. Assuming that the numerical control unit is an upward unit and the drive control units are downward units, numerical control unit 10 and drive control units 12 and 13 are connected by a pair of communication lines made up of a downward communication line 1 and an upward communication line 2. An acceleration sensor 112 and limit switches 113 and 114 are attached to a controlled machine, and machine information of error information, sequence information, etc., is sent to the numerical control unit 10. The numerical control system configured as shown in FIG. 14 synchronously operates the two drive control units 12 and 13 by one numerical control unit 10 and acquires machine information by a sensor and performs sequence control and emergency control. Data transmitted from a transmission section 20 of the numerical control unit 10 is communicated over the downward communication line 1 and is received at reception sections 22 and 23 of the drive control units 12 and 13. Over the downward communication line 1, control commands of position, speed, electric current, etc., servo parameters required for the drive control units to perform control, and warning and alarm signals given to the drive control units are communicated from the numerical control unit 10 to the drive control units 12 and 13. Data transmitted from transmission sections 42 and 43 of the drive control units 12 and 13 is communicated over the upward communication line 2 and is received at a reception section 40 of the numerical control unit 10. Over the upward communication line 2, detection data of the drive control units such as position, speed, and electric current, the current state of each of the drive control units, and data of warning and alarm signals, etc., are communicated from the drive control units 12 and 13 to the numerical control unit 10. The transmission data from the numerical control unit 10 is transmitted in synchronization with the control period of the numerical control unit 10. The transmission timing of data from each of the drive control units 12 and 13 is kept in synchronization based on the data from the numerical control unit 10 and is scheduled based thereon, an example of which is shown in FIG. 15. In FIG. 15, numeral 1000 denotes communication period of the numerical control unit 10, numeral 1001 denotes data transmitted from the numerical control unit 10, and numeral 1003 denotes data transmitted from the drive control units 12 and 13.

The drive control unit 12 inputs a control command from the numerical control unit 10, detection data of an encoder 101 attached to a motor shaft end, and detection data of a scale encoder 110 attached to the machine and performs servo control of a servomotor 100. The drive control unit 13 inputs a control command from the numerical control unit 10, detection data of an encoder 104 attached to a motor shaft end, and detection data of a scale encoder 111 attached to the machine and performs servo control of a servomotor 103. As the numerical control unit 10 synchronously operates the drive control units 12 and 13, the servomotors 100 and 103 drive ball screws 102 and 105 for moving a table 106 on which a workpiece 107 is placed, on the ball screws 102 and 105.

After detecting data of the acceleration sensor 112, the numerical control unit 10 transmits data to the downward communication line 1 and gives commands of position, speed, electric current, etc., to the drive control units 12 and 13 so as to prevent the machine from producing machine vibration and reduce overshoot at the machine position for improving the positioning accuracy.

When detecting some anomaly occurring in the system, the table 106 exceeding the moving range, and the limit switch 113, 114 being turned on, immediately the numerical control unit 10 transmits emergency stop information to the drive control units 12 and 13 via the downward communication line 1 for stopping the drive control units 12 and 13 of the servomotors 102 and 103.

By the way, to synchronously operate two axes or more in the numerical control system, if the numerical control unit 10 gives a control command to each of the drive control units 12 and 13 in an open loop, when a disturbance is applied to one axis in synchronous operation, a large synchronization error appears. Thus, the numerical control unit 10 in the related art calculates a command in synchronization based on the detection data of position, speed, electric current, etc., transmitted from the drive control units 12 and 13 and then transmits the command to the drive control units 12 and 13, as described above.

However, if the numerical control unit 10 itself thus generates an error correction command, the preparation of the error correction command imposes a calculation load on the numerical control unit 10 and further the prepared command is a command delayed by one control period and for a disturbance like an impulse, a large synchronization error appears as a command is given in an open loop.

Thus, to prevent a disturbance like an impulse from causing a synchronization error to occur, as shown in FIG. 16, the drive control unit 12 is provided with a reception section 51 connected to the upward communication line 2 and receives at the reception section 51 the detection data of position, speed, electric current, etc., of the drive control unit 13 transmitted in accordance with the control period of the numerical control unit 10 and compares the received detection data with the detection data of the drive control unit 12, thereby correcting the synchronization error before the next control period of the numerical control unit 10. The system shown in FIG. 16 is disclosed in JP-A-9-34520.

However, if the drive control unit 12 corrects the synchronization error as described above, the data of the drive control units 12 and 13 is transmitted in accordance with the control period of the numerical control unit 10 and therefore the period in which the drive control unit 12 can correct the synchronization error depends on the control period of the numerical control unit 10 and thus there is a limit to correcting of the synchronization error with good accuracy by the drive control unit 12. To improve the control performance of the drive control unit, it is possible to shorten the control period of the numerical control unit; however, to provide the numerical control unit with high performance, complicated coordinate computation and control processing need to be performed for a larger number of control axes and it is not easy to shorten the control period.

For the drive control unit to perform control based on a plurality of pieces of sensor information, the drive control unit requires a large number of connectors, etc., for receiving detection data, but it is substantially impossible to provide the drive control unit with connectors, etc., for receiving detection data corresponding to sensors. Therefore, the numerical control unit 10 in place of the drive control unit inputs the detection data of the acceleration sensor 112 and generates a command. Thus, the command is delayed by one control period as in the synchronous operation described above and if machine information is acquired by the sensor, the control performance is not much improved and there is a problem of increasing the calculation load on the numerical control unit 10.

To conduct emergency stop of the system by the limit switch 113, 114 for safety, the information of the limit switch 113, 114 is once processed by the numerical control unit 10 and is transmitted as data. Thus, the idle time is large and the coasting distance after the emergency stop is extended.

DISCLOSURE OF THE INVENTION

The invention is intended for solving the problems described above and it is an object of the invention to provide a servomotor drive control system that can correct a synchronization error accurately if the synchronization error is corrected in drive control units.

It is another object of the invention to provide a servomotor drive control system for making it possible to decrease calculation loads on a command unit of a numerical control unit, etc., and drive control units, moreover for drive control units having the same control performance, to increase the number of axes to which synchronization error correction can be made using one type of drive control unit, and by extension to easily make the system highly accurate.

It is another object of the invention to provide a servomotor drive control system for making it possible to decrease calculation loads on a command unit of a numerical control unit, etc., and drive control units and moreover to perform high-speed and high-accuracy synchronous operation.

It is still another object of the invention to provide a servomotor drive control system for making it possible for drive control units to detect a plurality of pieces of sensor information without increasing the number of connectors for detector data reception and not via a command unit of a numerical control unit, etc., and by extension to make the system a high-speed and high-accuracy system.

To the ends, according to the invention, in a servomotor drive control system comprising a command unit of a numerical control unit, etc., a plurality of drive control units for controlling drive of servomotors, a first communication line for transmitting data of a control command, etc., in a direction of the above-mentioned plurality of drive control units from the above-mentioned command unit, and a second communication line for transmitting data of detection data, etc., in a direction of the above-mentioned command unit from the above-mentioned plurality of drive control units, wherein data is transferred between the above-mentioned plurality of drive control units using the above-mentioned communication lines, whereby the above-mentioned servomotors are synchronously controlled, the communication period between the above-mentioned drive control units is set to one-nth of the communication period of the above-mentioned command unit (n is an integer).

According to the invention, in a servomotor drive control system comprising a command unit of a numerical control unit, etc., a plurality of drive control units for controlling drive of servomotors, a first communication line for transmitting data of a control command, etc., in a direction of the above-mentioned plurality of drive control units from the above-mentioned command unit, and a second communication line for transmitting data of detection data, etc., in a direction of the above-mentioned command unit from the above-mentioned plurality of drive control units, wherein the above-mentioned plurality of drive control units synchronously control the servomotors, a motion control unit is placed between the above-mentioned command unit and the above-mentioned plurality of drive control units for receiving the control command given to the above-mentioned plurality of drive control units, transmitted through the above-mentioned first communication line from the above-mentioned command unit, receiving the detection data transmitted through the above-mentioned second communication line from the above-mentioned plurality of drive control units, generating a synchronization error correction control command based on the received control command and detection data mentioned above, and transmitting the generated synchronization error correction control command to the above-mentioned drive control units through the above-mentioned first communication line, and the above-mentioned drive control units receive the control command from the above-mentioned command unit and the synchronization error correction control command from the above-mentioned motion control unit, transmitted through the above-mentioned first communication line and control the servomotors based on the received control command and synchronization error correction control command.

In the invention, in the above-mentioned servomotor drive control system, the communication period between the above-mentioned motion control unit and the above-mentioned drive control units is set to one-nth of the communication period of the above-mentioned command unit (n is an integer).

According to the invention, in a servomotor drive control system comprising a command unit of a numerical control unit, etc., a plurality of drive control units for controlling drive of a servomotor, a first communication line for transmitting data of a control command, etc., in a direction of the above-mentioned plurality of drive control units from the above-mentioned command unit, and a second communication line for transmitting data of detection data, etc., in a direction of the above-mentioned command unit from the above-mentioned plurality of drive control units, a sensor control unit is provided for inputting detection data of a sensor and transmitting the data directly to the above-mentioned plurality of drive control units through the above-mentioned first or second communication line, and the above-mentioned plurality of drive control units receives the control command from the above-mentioned command unit transmitted through the above-mentioned first communication line and the detection data of the sensor transmitted through the above-mentioned first or second communication line, and controls the servomotor based on the received control command and detection data of the sensor.

In the invention, in the above-mentioned servomotor drive control system, the communication period between the above-mentioned drive control unit and the above-mentioned sensor control unit is set to one-nth of the communication period of the above-mentioned command unit (n is an integer).

According to the invention, in a servomotor drive control system comprising a command unit of a numerical control unit, etc., a plurality of drive control units for controlling drive of servomotors, a first communication line for transmitting data of a control command, etc., in a direction of the above-mentioned plurality of drive control units from the above-mentioned command unit, and a second communication line for transmitting data of detection data, etc., in a direction of the above-mentioned command unit from the above-mentioned plurality of drive control units, wherein the above-mentioned plurality of drive control units synchronously control the servomotors, a sensor control unit is provided for inputting detection data of a sensor and transmitting the data directly to the above-mentioned drive control units through the above-mentioned first or second communication line, a motion control unit is placed between the above-mentioned command unit and the above-mentioned plurality of drive control units for receiving the control command given to the above-mentioned plurality of drive control units, transmitted through the above-mentioned first communication line from the above-mentioned command unit, receiving the detection data transmitted through the above-mentioned second communication line from the above-mentioned plurality of drive control units, generating a synchronization error correction control command based on the received control command and detection data mentioned above, and transmitting the generated synchronization error correction control command to the above-mentioned drive control units through the above-mentioned first communication line, and the above-mentioned drive control units receive the control command from the above-mentioned command unit transmitted through the above-mentioned first communication line, the synchronization error correction control command from the above-mentioned motion control unit transmitted through the above-mentioned first communication line, and the detection data of the sensor transmitted through the above-mentioned first or second communication line, and control the servomotors based on the received control command, synchronization error correction control command, and detection data of the sensor.

In the invention, in the above-mentioned servomotor drive control system, the communication period between the above-mentioned motion control unit, the above-mentioned drive control units, and the above-mentioned sensor control unit is set to one-nth of the communication period of the above-mentioned command unit (n is an integer).

According to the invention, in a servomotor drive control system comprising a command unit of a numerical control unit, etc., a plurality of drive control units for controlling drive of servomotors, a first communication line for transmitting data of a control command, etc., in a direction of the above-mentioned plurality of drive control units from the above-mentioned command unit, and a second communication line for transmitting data of detection data, etc., in a direction of the above-mentioned command unit from the above-mentioned plurality of drive control units, wherein the above-mentioned plurality of drive control units synchronously control the servomotors, a motion control unit is placed between the above-mentioned command unit and the above-mentioned plurality of drive control units, the above-mentioned first and second communication lines can be disconnected in the above-mentioned motion control unit, with the above-mentioned first and second communication lines disconnected in the above-mentioned motion control unit, the above-mentioned motion control unit receives the control command for a plurality of periods given to the above-mentioned plurality of drive control units, transmitted through the above-mentioned first communication line from the above-mentioned command unit in the communication period defined by the above-mentioned command unit, divides the received control command into a plurality of pieces, transmits the provided control command pieces to the above-mentioned plurality of drive control units through the above-mentioned first communication line in one-nth (n is an integer) of the communication period defined by the above-mentioned command unit, receives the detection data transmitted through the above-mentioned second communication line in one-nth (n is an integer) of the communication period defined by the above-mentioned command unit from the above-mentioned plurality of drive control units, generates a synchronization error correction control command based on the received detection data and the received control command from the above-mentioned command unit, transmits the synchronization error correction control command to the above-mentioned drive control units through the above-mentioned first communication line in one-nth (n is an integer) of the communication period defined by the above-mentioned command unit, and transmits the received data of the detection data, etc., transmitted from the above-mentioned plurality of drive control units to the above-mentioned command unit through the above-mentioned second communication line in the communication period defined by the above-mentioned command unit, and the above-mentioned drive control units receive the control command and the synchronization error correction control command transmitted through the above-mentioned first communication line in one-nth (n is an integer) of the communication period defined by the above-mentioned command unit and control the servomotors based on the received control command and synchronization error correction control command.

Further, according to the invention, in a servomotor drive control system comprising a command unit of a numerical control unit, etc., a plurality of drive control units for controlling drive of servomotors, a first communication line for transmitting data of a control command, etc., in a direction of the above-mentioned plurality of drive control units from the above-mentioned command unit, and a second communication line for transmitting data of detection data, etc., in a direction of the above-mentioned command unit from the above-mentioned plurality of drive control units, wherein the above-mentioned plurality of drive control units synchronously control the servomotors, a motion control unit is placed between the above-mentioned command unit and the above-mentioned plurality of drive control units, a sensor control unit is provided for inputting detection data of a sensor and transmitting the data directly to the above-mentioned drive control unit through the above-mentioned first or second communication line, the above-mentioned first and second communication lines can be disconnected in the above-mentioned motion control unit, with the above-mentioned first and second communication lines disconnected in the above-mentioned motion control unit, the above-mentioned motion control unit receives the control command for a plurality of periods given to the above-mentioned plurality of drive control units, transmitted through the above-mentioned first communication line from the above-mentioned command unit in the communication period defined by the above-mentioned command unit, divides the received control command into a plurality of pieces, transmits the provided control command pieces to the above-mentioned plurality of drive control units through the above-mentioned first communication line in one-nth (n is an integer) of the communication period defined by the above-mentioned command unit, receives the detection data transmitted through the above-mentioned second communication line in one-nth (n is an integer) of the communication period defined by the above-mentioned command unit from the above-mentioned plurality of drive control units, generates a synchronization error correction control command based on the received detection data and the received control command from the above-mentioned command unit, transmits the synchronization error correction control command to the above-mentioned drive control units through the above-mentioned first communication line in one-nth (n is an integer) of the communication period defined by the above-mentioned command unit, and transmits the received data of the detection data, etc., transmitted from the above-mentioned plurality of drive control units to the above-mentioned command unit through the above-mentioned second communication line in the communication period defined by the above-mentioned command unit, and the above-mentioned plurality of drive control units receive the control command and the synchronization error correction control command transmitted through the above-mentioned first communication line in one-nth (n is an integer) of the communication period defined by the above-mentioned command unit, receives the detection data of the sensor transmitted through the above-mentioned first or second communication line in one-nth (n is an integer) of the communication period defined by the above-mentioned command unit, and control the servomotors based on the received control command, synchronization error correction control command, and detection data of the sensor.

BEST MODE FOR CARRYING OUT THE INVENTION

First Embodiment

A first embodiment of the invention will be discussed with FIGS. 1 and 2.

Figure 1:
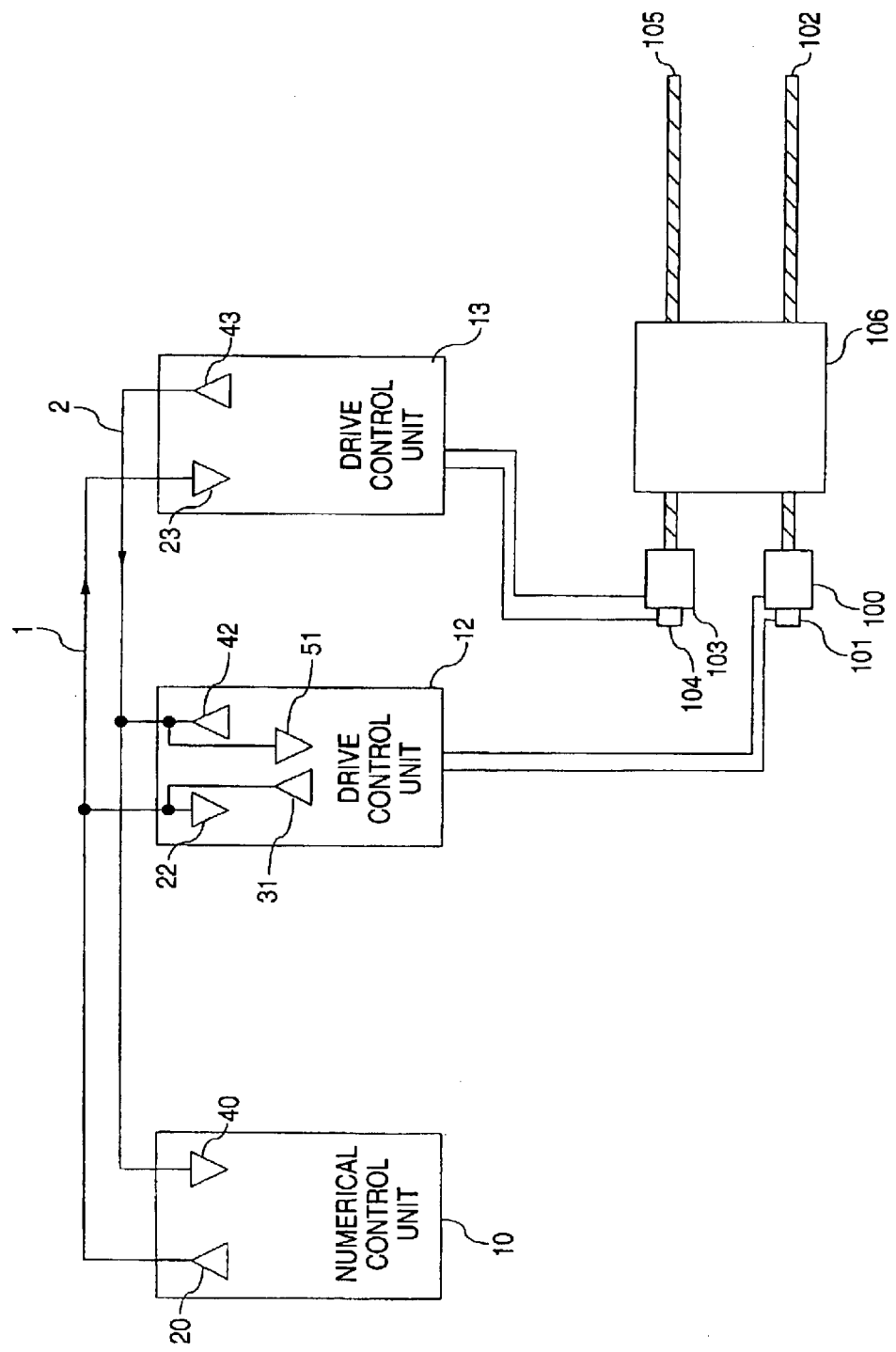
FIG. 1 is a diagram to show the configuration of a numerical control system according to a first embodiment of the invention.

FIG. 1 is a diagram to show the configuration of a numerical control system, a kind of servomotor drive control system, with one numerical control unit and two drive control units for performing synchronous operation between the drive control units. FIG. 2 is a control flow chart of the numerical control system (timing chart of transmission and reception data).

In FIG. 1, numeral 10 denotes a numerical control unit of a command unit having a transmission section 20 connected to a downward communication line 1 (in the direction of drive control units) (first communication line) and a reception section 40 connected to an upward communication line 2 (in the direction of the numerical control unit) (second communication line). Numeral 12 denotes a master drive control unit having a reception section 22 and a transmission section 31 connected to the downward communication line 1 and a transmission section 42 and a reception section 51 connected to the upward communication line 2. Numeral 13 denotes a slave drive control unit for synchronously operating with the drive control unit 12, the drive control unit 13 having a reception section 23 connected to the downward communication line 1 and a transmission section 43 connected to the upward communication line 2. Numeral 100 denotes a servomotor controlled by the drive control unit 12 and numeral 101 denotes an encoder attached to a shaft end of the servomotor 100. Output of the encoder is input to the drive control unit 12. Numeral 102 denotes a ball screw driven by the servomotor 100, numeral 103 denotes a servomotor controlled by the drive control unit 13, and numeral 104 denotes an encoder attached to a shaft end of the servomotor 103. Output of the encoder is input to the drive control unit 13. Numeral 105 denotes a ball screw driven by the servomotor 103 and numeral 106 denotes a table of a machine tool, etc., moved as the ball screws 102 and 105 are driven.

The communication period of the drive control unit 12, 13 is set to one-nth of the communication period of the numerical control unit 10 (n is an integer; in the embodiment, n=2). To compensate for a communication period deviation, the numerical control unit 10 may transmit communication period synchronization data to the drive control units 12 and 13 whenever it transmits control data and when the drive control unit 12, 13 receives the communication period synchronization data, a communication period counter for generating the communication period of the drive control unit 12, 13 may be forcibly reset and the communication period counter for generating the communication period of the drive control unit 12, 13 may be self-reset every one-nth of the communication period of the numerical control unit 10. The method of sensing the reception data and synchronizing is based on HDLC protocol.

Figure 2:
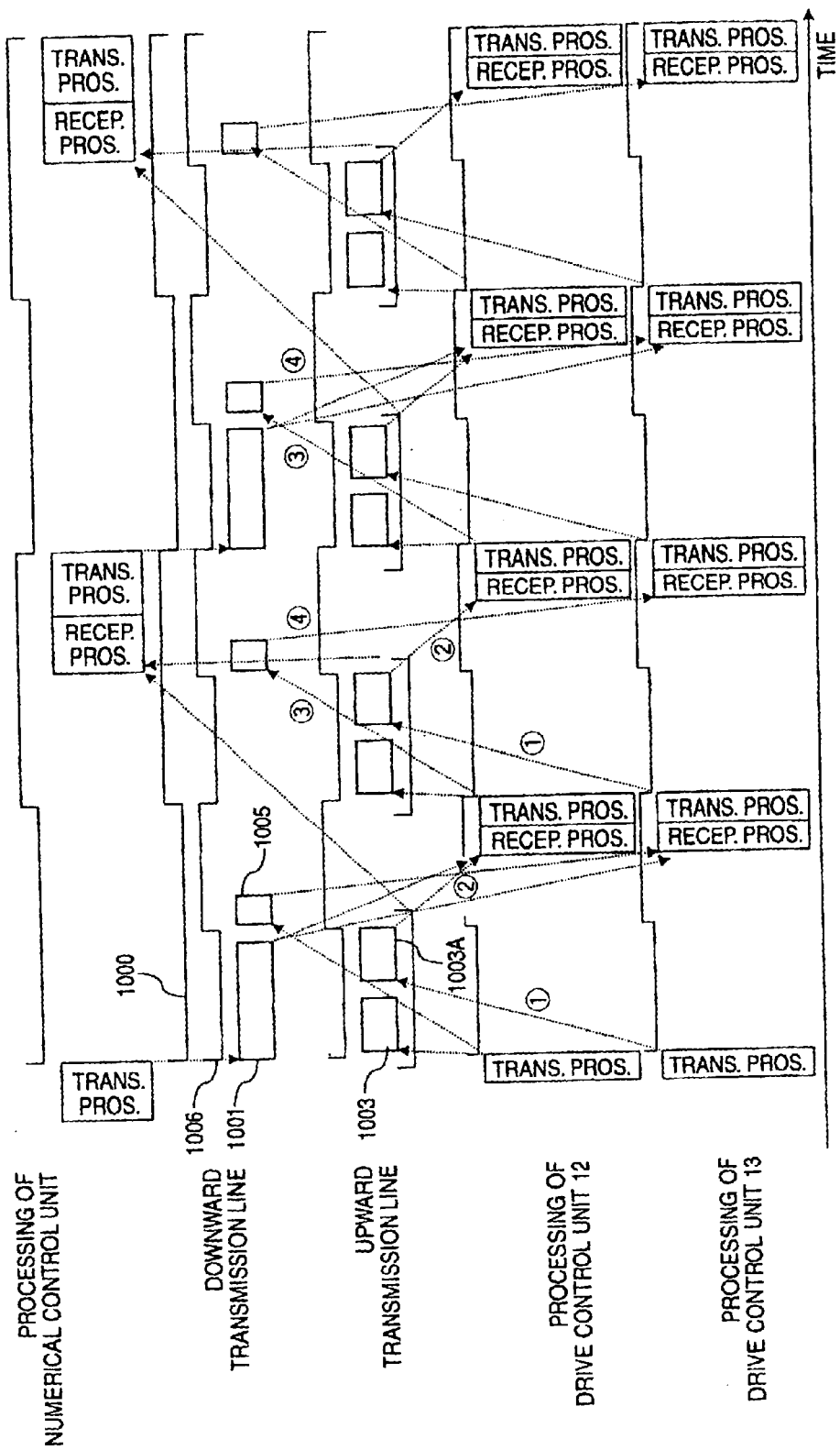
FIG. 2 is a control flow diagram of the numerical control system according to the first embodiment of the invention.

The numerical control system according to the first embodiment is configured as described above and operates as follows:

The numerical control unit 10 uses the transmission section 20 to transmit a control command 1001 to the downward communication line 1 every communication period 1000 of the numerical control unit, as shown in FIG. 2. The drive control unit 12 controls the servomotor 100 based on the control command 1001 transmitted from the numerical control unit 10 and received at the reception section 22 and the detection data of the encoder 101 attached to the motor shaft end, and the drive control unit 13 controls the servomotor 103 based on the control command 1001 transmitted from the numerical control unit 10 and received at the reception section 23 and the detection data of the encoder 104 attached to the motor shaft end. The servomotors 100 and 103 drive the ball screws 102 and 105 for moving the table 106 on the ball screws 102 and 105 as commanded.

At this time, the drive control unit 13 transmits diagnosis data of the current state, a warning, an alarm, etc., and detection data 1003A of position, speed, electric current, etc., detected when the servomotor 103 is controlled to the upward communication line 2 by the transmission section 43 (① in FIG. 2). Thus, the drive control unit 12 receives the detection data 1003A of position, speed, electric current, etc., of the drive control unit 13 transmitted to the upward communication unit 10 (② in FIG. 2). The drive control unit 12 compares the line 2 at the reception section 51 not via the numerical control detection data with the detection data of the drive control unit 12, thereby calculating a synchronization error and prepares a synchronization error correction control command given to the drive control unit 13 and transmits the synchronization error correction control command 1005 to the downward communication line 1 from the transmission section 31 (③ in FIG. 2). The drive control unit 13 receives the synchronization error correction control command 1005 transmitted through the downward communication line 1 at the reception section 23 (④ in FIG. 2) and performs servo control of the servomotor 103 so as to correct the synchronization error.

The drive control unit 12 transmits diagnosis data of the current state, a warning, an alarm, etc., and current value detection data 1003 of position, speed, electric current, etc., detected when the servomotor 100 is controlled to the upward communication line 2 by the transmission section 42. The numerical control unit 10 receives the data 1003 and 1003A transmitted from the drive control units 12 and 13 at the reception section 40, monitors the data, and performs alarm processing, etc., for the drive control units 12 and 13 as required.

By the way, in the first embodiment, the data transmission and reception timings of the units are scheduled so that they do not collide with each other as the data transmission and reception timings of the units are shown in FIG. 2, and communication period 1006 of the drive control unit 12, 13 is set to one half the communication period 1000 of the numerical control unit 10.

Thus, while the numerical control unit 10 transmits one control command 1001, the drive control unit 12 can receive twice the detection data 1003A of the drive control unit 13 transmitted through the upward communication line 2 and can transmit twice the synchronization error correction control command 1005 through the downward communication line 1 to the drive control unit 13. Likewise, during one communication period of the numerical control unit 10, the drive control unit 13 can transmit twice the detection data 1003A through the upward communication line 2 and can receive twice the synchronization error correction control command 1005.

Correction processing (correction calculation, output processing of the calculation result to servomotor) based on the synchronization error correction control command 1005 received by the drive control unit 13 is executed while transmission/reception processing is not performed. The drive control unit 12 generates the synchronization error correction control command 1005 between reception processing and transmission processing although not shown.

Since the correction processing capability of the drive control unit 13 is already known, when the drive control unit 13 performs correction calculation, if it is determined that the calculation processing is not complete by the time another command comes from the numerical control unit 10, the drive control unit 13 performs correction only in the correction processing amount that can be completed by the time another command comes from the numerical control unit 10, and discards the remaining correction processing amount.

As described above, according to the first embodiment, the synchronization error correction control command 1005 given by the drive control unit 12 to the drive control unit 13 can be transmitted at high speed independently of the communication period of the numerical control unit 10 and therefore the calculation load for preparing the synchronization error correction control command is not imposed on the numerical control unit 10 and moreover it is made possible to suppress the synchronization error amount caused by a disturbance like an impulse in a short time.

In the first embodiment, the communication period 1006 of the drive control unit 12, 13 is set to one half the communication period 1000 of the numerical control unit 10. If the communication period is furthermore shortened, for example, to one-third or one-fourth, it is made possible to suppress the synchronization error amount caused by a disturbance like an impulse in a shorter time.

In the first embodiment, the drive control unit 12 is the master and the drive control unit 13 is the slave, namely, if the drive control unit 12 of the master makes correction, what the control reference is becomes indistinct and the control becomes complicated and thus the drive control unit 13 of the slave makes synchronization error correction. However, if it is more important to speed up the synchronization error correction than to avoid complication of the control, only the drive control unit 12 of the master may make synchronization error correction. In this case, the transmission section 31 of the drive control unit 12 becomes unnecessary.

The synchronization error correction can also be shared between the drive control unit 12 and the drive control unit 13.

Second Embodiment

Next, a second embodiment of the invention will be discussed with FIGS. 3 and 4.

Figure 3:
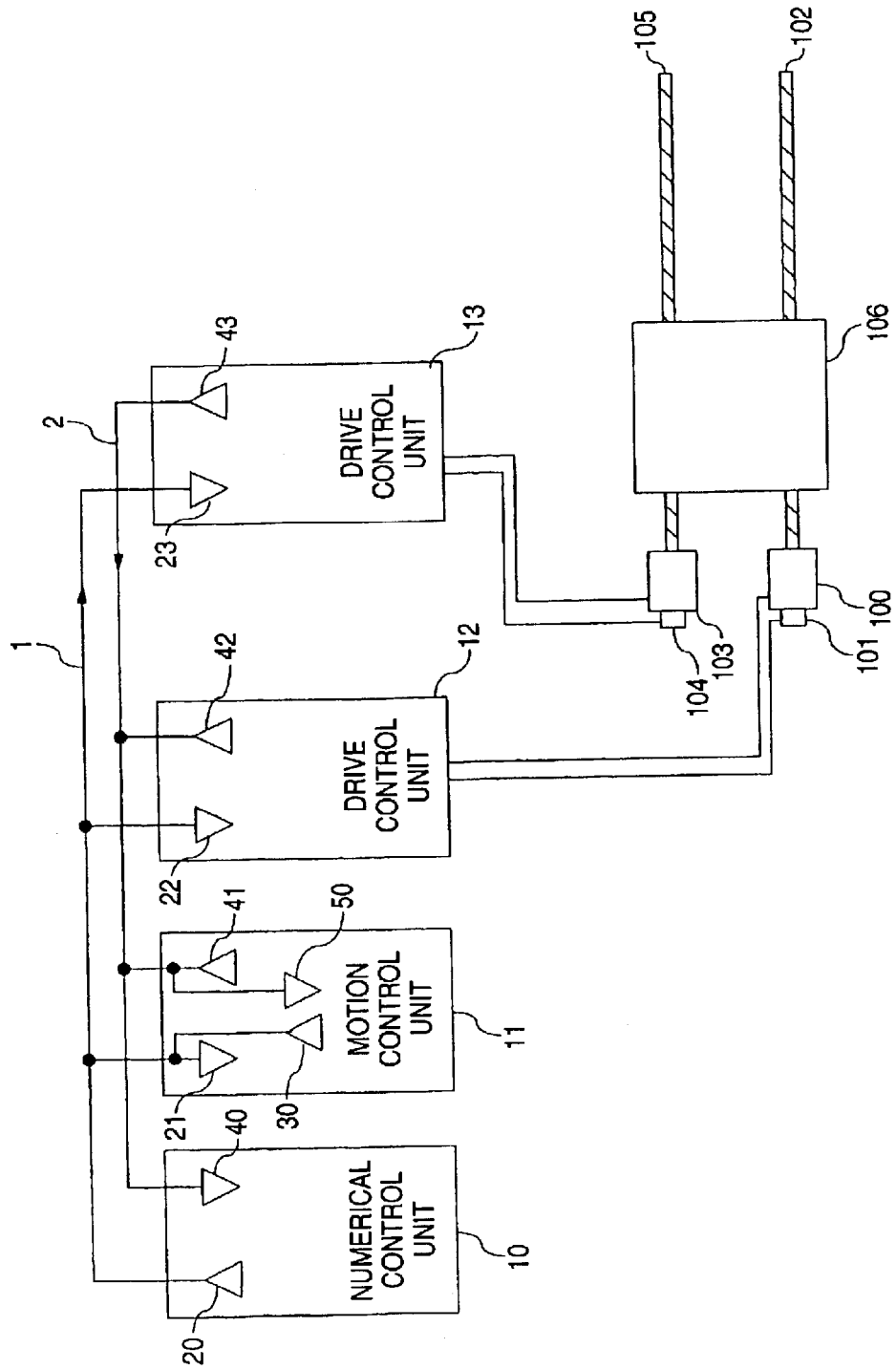
FIG. 3 is a diagram to show the configuration of a numerical control system according to a second embodiment of the invention.

FIG. 3 is a diagram to show the configuration of a numerical control system, a kind of servomotor drive control system, with one numerical control unit, one motion control unit, and two drive control units for performing synchronous operation between the drive control units. FIG. 4 is a control flowchart of the numerical control system (timing chart of transmission and reception data).

In FIG. 3, numeral 10 denotes a numerical control unit of a command unit having a transmission section 20 connected to a downward communication line 1 (in the direction of motion control unit and drive control units) (first communication line) and a reception section 40 connected to an upward communication line 2 (in the direction of the numerical control unit) (second communication line). Numeral 11 denotes a motion control unit for calculating a synchronization error between two axes and generating a synchronization error correction control command, the motion control unit 11 having a transmission section 30 and a reception section 21 connected to the downward communication line 1 and a transmission section 41 and a reception section 50 connected to the upward communication line 2. The numerical control unit 10 and the motion control unit 11 have their respective calculation CPUs. Numeral 12 denotes a master drive control unit having a reception section 22 connected to the downward communication line 1 and a transmission section 42 connected to the upward communication line 2. Numeral 13 denotes a slave drive control unit for synchronously operating with the drive control unit 12, the drive control unit 13 having a reception section 23 connected to the downward communication line 1 and a transmission section 43 connected to the upward communication line 2. Numeral 100 denotes a servomotor controlled by the drive control unit 12 and numeral 101 denotes an encoder attached to a shaft end of the servomotor 100. Output of the encoder is input to the drive control unit 12. Numeral 102 denotes a ball screw driven by the servomotor 100, numeral 103 denotes a servomotor controlled by the drive control unit 13, and numeral 104 denotes an encoder attached to a shaft end of the servomotor 103. Output of the encoder is input to the drive control unit 13. Numeral 105 denotes a ball screw driven by the servomotor 103 and numeral 106 denotes a table of a machine tool, etc., moved as the ball screws 102 and 105 are driven.

Figure 4:
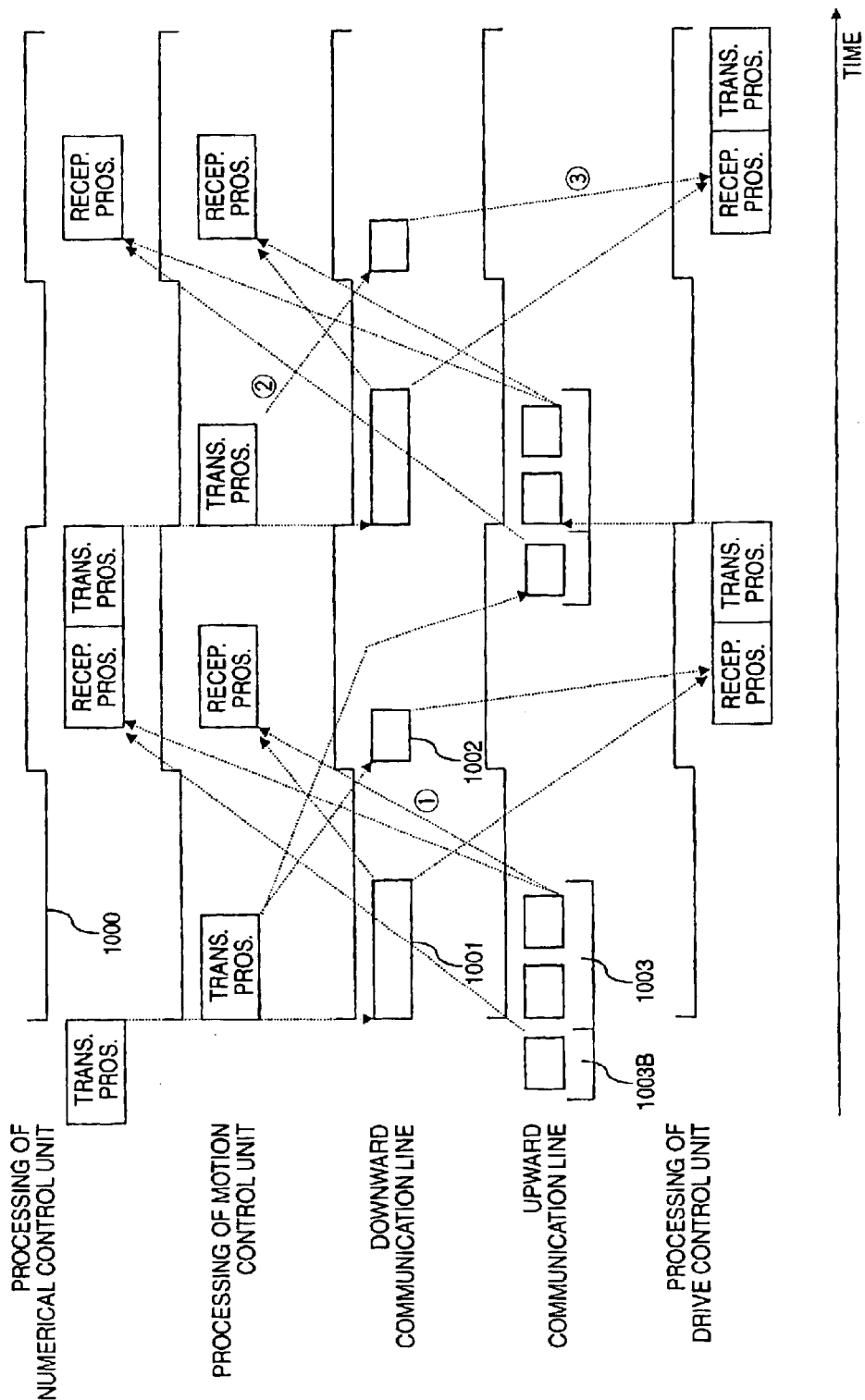
FIG. 4 is a control flow diagram of the numerical control system according to the second embodiment of the invention.

The numerical control system according to the second embodiment is configured as described above and operates as follows:

The numerical control unit 10 uses the transmission section 20 to transmit a control command 1001 to the downward communication line 1 every communication period 1000 of the numerical control unit, as shown in FIG. 4. The drive control unit 12 controls the servomotor 100 based on the control command 1001 transmitted from the numerical control unit 10 and received at the reception section 22 and the detection data of the encoder 101 attached to the motor shaft end, and the drive control unit 13 controls the servomotor 103 based on the control command 1001 transmitted from the numerical control unit 10 and received at the reception section 23 and the detection data of the encoder 104 attached to the motor shaft end. The servomotors 100 and 103 drive the ball screws 102 and 105 for moving the table 106 on the ball screws 102 and 105 as commanded.

At this time, the drive control unit 12, 13 transmits diagnosis data of the current state, a warning, an alarm, etc., and detection data 1003 of position, speed, electric current, etc., detected when the servomotor 100, 103 is controlled to the upward communication line 2 by the transmission section 42, 43 every control period 1000 of the numerical control unit 10. The data 1003 transmitted from the drive control unit 12, 13 is scheduled within the communication period 1000 defined by the numerical control unit 10 and the transmission data pieces are transmitted to the upward communication line 2 without colliding with each other, as shown in FIG. 4.

In FIG. 4, numeral 1002 denotes a synchronization error correction control command prepared by the motion control unit 11 and transmitted to the drive control unit 13 through the transmission section 30 and the downward communication line 1, and numeral 1003B denotes data of the synchronization error correction amount, the status of the motion control unit 11, etc., transmitted by the motion control unit 11 to the numerical control unit 10 through the transmission section 41 and the upward communication line 2.

By the way, in such a system, the synchronous control performance of the drive control units 12 and 13 becomes very important. If the control performance is low, the ball screw causes a resonance or the table positioning accuracy is poor; sufficient control performance cannot be provided.

Then, in the second embodiment, the motion control unit 11 receives the control command 1001 transmitted from the numerical control unit 10 through the downward communication line 1 at the reception section 21, and receives the detection data 1003 of position, speed, electric current, etc., transmitted from the drive control units 12 and 13 through the upward communication line 2 at the reception section 50 ((1) in FIG. 4).

Since the data transmitted from the drive control units 12 and 13 is scheduled as described above, the motion control unit 11 can receive the detection data 1003 of the drive control units 12 and 13 like the numerical control unit 10.

Based on the described reception data, the motion control unit 11 detects a lag from the control command of the two drive control units 12 and 13 performing synchronous control and a synchronization error between axes, generates a synchronization error correction control command 1002, and transmits the data 1002 from the transmission section 30 over the downward communication line 1 to the drive control unit 13 ((2) in FIG. 4).

At the time, the synchronization error correction control command 1002 from the motion control unit 11 is scheduled as shown in FIG. 4 and is transmitted over the downward communication line 1 without colliding with the control command 1001 from the numerical control unit 10.

The drive control unit 13 receives the synchronization error correction control command 1002 transmitted from the motion control unit 11 at the reception section 23 ((3) in FIG. 4) and corrects the synchronization error.

The synchronization error correction control command 1002 generated by the motion control unit 11 is assigned the address corresponding to the address of the drive control unit 13 for transmission and thus is not received by the drive control unit 12 and can be received only by the drive control unit 13.

The motion control unit 11 transmits the data 1003B of the synchronization error correction amount, the status of the motion control unit 11, etc., from the transmission section 41 to the upward communication line 2. The numerical control unit 10 receives the data at the reception section 40 together with the data 1003 transmitted from the drive control unit 12, 13, monitors the data, and performs alarm processing, etc., for the drive control unit 12, 13 as required.

Correction processing (correction calculation, output processing of the calculation result to servomotor) based on the synchronization error correction control command 1002 received by the drive control unit 13 is executed while transmission/reception processing is not performed. The motion control unit 11 generates the synchronization error correction control command 1002 between reception processing and transmission processing although not shown.

Since the correction processing capability of the drive control unit 13 is already known, when the drive control unit 13 performs correction calculation, if it is determined that the calculation processing is not complete by the time another command comes from the numerical control unit 10, the drive control unit 13 performs correction only in the correction processing amount that can be completed by the time another command comes from the numerical control unit 10, and discards the remaining correction processing amount.

As described above, according to the second embodiment, the motion control unit 11 generates the synchronization error correction control command, whereby the calculation load on the numerical control unit 10 for preparing the synchronization error or the control processing load on the drive control unit 12 for correcting the synchronization error can be reduced.

For example, if the drive control unit 12 corrects the synchronization error as in the related art, in addition to the usual control calculation, the calculation load for correcting the synchronization error occurs on the drive control unit 12 and it may become impossible to complete synchronization error handling within one control period. However, according to the second embodiment, such a disadvantage is eliminated.

To increase the number of axes that can be controlled, a drive control unit having the same configuration as the drive control unit 12, 13 is added with the numerical control unit 10 and the drive control units 12 and 13 intact, whereby the number of axes to which synchronization error correction can be made can be increased and by extension it is easily made possible to make the system highly accurate.

In the second embodiment, the drive control unit 12 is the master and the drive control unit 13 is the slave, namely, if the drive control unit 12 of the master makes correction, what the control reference is becomes indistinct and the control becomes complicated and thus the drive control unit 13 of the slave makes synchronization error correction. However, only the drive control unit 12 of the master may make synchronization error correction.

The synchronization error correction can also be shared between the drive control unit 12 and the drive control unit 13.

Third Embodiment

Next, a third embodiment of the invention will be discussed with FIGS. 3 and 5.

Figure 5:
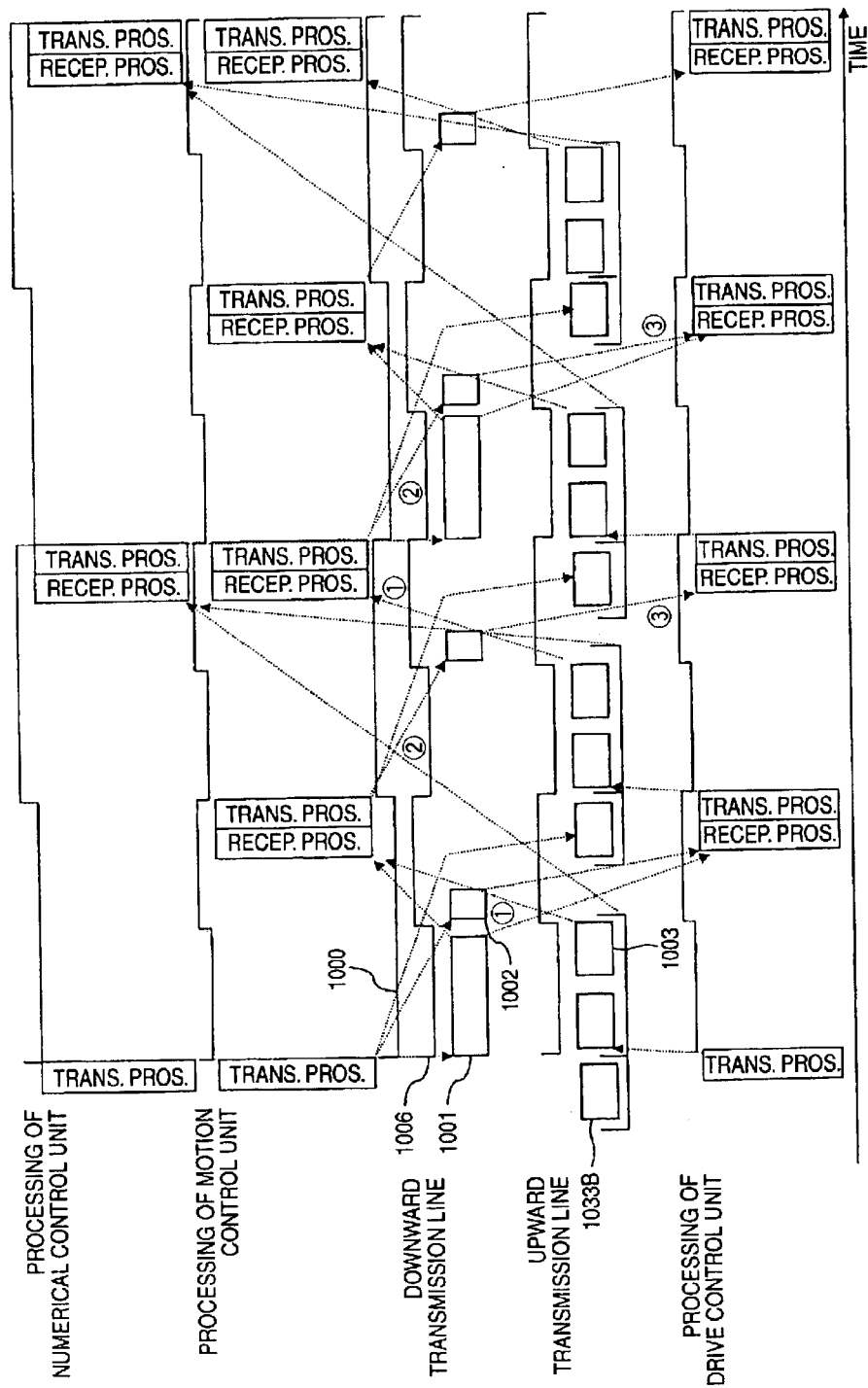
FIG. 5 is a control flow diagram of a numerical control system according to a third embodiment of the invention.

In the third embodiment, a numerical control system for performing synchronous operation in a similar configuration to that of the second embodiment shown in FIG. 3, a communication period 1006 of each of a motion control unit 11 and drive control units 12 and 13 is set to one-nth of a communication period 1000 of a numerical control unit 10 (n is an integer; in the embodiment, n=2) as the data transmission and reception timings of the units are shown in FIG. 5.

In the third embodiment, the contents of the data transmitted and received by the numerical control unit 10, the motion control unit 11, and the drive control units 12 and 13 are similar to those in the second embodiment 2.

Thus, the numerical control unit 10 transmits data in the communication period 1000 defined based on the control period of the numerical control unit 10 and each of the motion control unit 11 and the drive control units 12 and 13 transmits and receives data in the communication period 1006 of one half the communication period 1000 of the numerical control unit 10. Thus, while the numerical control unit 10 transmits one control command 1001, the motion control unit 11 can receive twice detection data 1003 of the drive control unit 12, 13 transmitted through an upward communication line 2 and can transmit twice a synchronization error correction control command 1002 through a downward communication line 1 to the drive control unit 13. Likewise, during one communication period of the numerical control unit 10, the drive control unit 12, 13 can transmit twice the detection data 1003 through the upward communication line 2 and the drive control unit 13 can receive twice the synchronization error correction control command 1002.

As described above, according to the third embodiment, the motion control unit 11 generates the synchronization error correction control command, whereby the calculation load on the numerical control unit 10 for preparing the synchronization error or the control processing load on the drive control unit 12 for correcting the synchronization error can be reduced.

For example, if the drive control unit 12 corrects the synchronization error as in the related art, in addition to the usual control calculation, the calculation load for correcting the synchronization error occurs on the drive control unit 12 and it may become impossible to complete synchronization error handling within one control period. However, according to the second embodiment, such a disadvantage is eliminated.

To increase the number of axes that can be controlled, a drive control unit having the same configuration as the drive control unit 12, 13 is added with the numerical control unit 10 and the drive control units 12 and 13 intact, whereby the number of axes to which synchronization error correction can be made can be increased and by extension it is easily made possible to make the system highly accurate.

The synchronization error correction control command 1002 transmitted by the motion control unit 11 is made independent of the control period of the numerical control unit 10 and thus it is made possible to suppress the synchronization error amount caused by a disturbance like an impulse in a short time.

In the third embodiment, the communication period 1006 of each of the motion control unit 11 and the drive control units 12 and 13 is set to one half the communication period 1000 of the numerical control unit 10. If the communication period is furthermore shortened, for example, to one-third or one-fourth, it is made possible to suppress the synchronization error amount caused by a disturbance like an impulse in a shorter time.

Fourth Embodiment

Next a fourth embodiment of the invention will be discussed with FIGS. 6 to 8.

Figure 6:
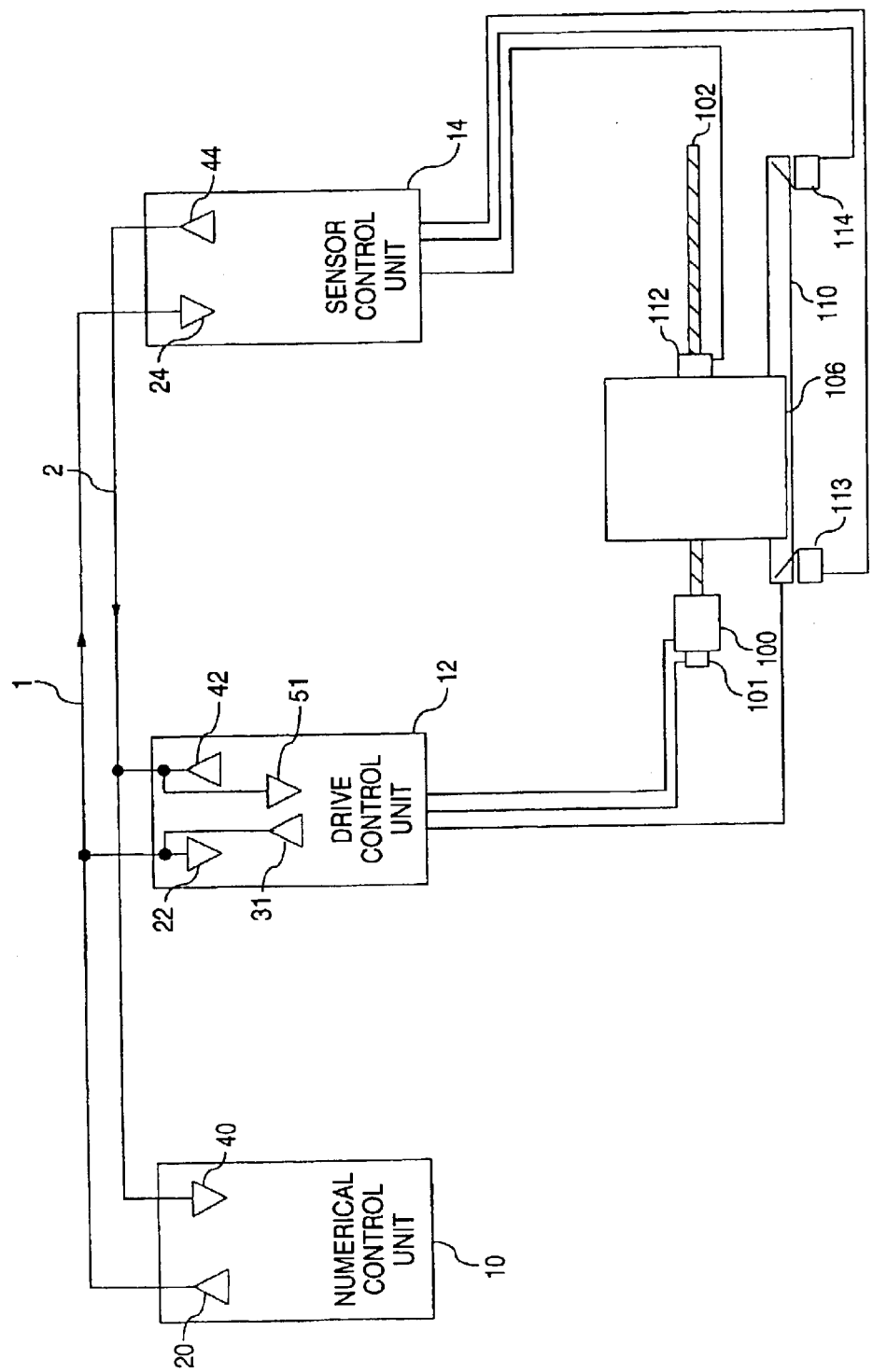
FIG. 6 is a diagram to show the configuration of a numerical control system according to a fourth embodiment of the invention.

FIG. 6 is a diagram to show the configuration of a numerical control system, a kind of servomotor drive control system, with one numerical control unit, one drive control unit, and one sensor control unit for feeding back detection data of the sensor control unit and performing motor control. FIG. 7 is a diagram to show the configuration of the sensor control unit. FIG. 8 is a control flow chart of the numerical control system (timing chart of transmission and reception data).

In FIG. 6, numeral 10 denotes a numerical control unit of a command unit having a transmission section 20 connected to a downward communication line 1 (first communication line) and a reception section 40 connected to an upward communication line 2 (second communication line). Numeral 12 denotes a drive control unit having a reception section 22 and a transmission section 31 connected to the downward communication line 1 and a transmission section 42 and a reception section 51 connected to the upward communication line 2. Numeral 14 denotes a sensor control unit for controlling a plurality of sensors and managing transfer of data over the communication lines 1 and 2, the sensor control unit 14 having a reception section 24 connected to the downward communication line 1 and a transmission section 44 connected to the upward communication line 2.

Figure 7:
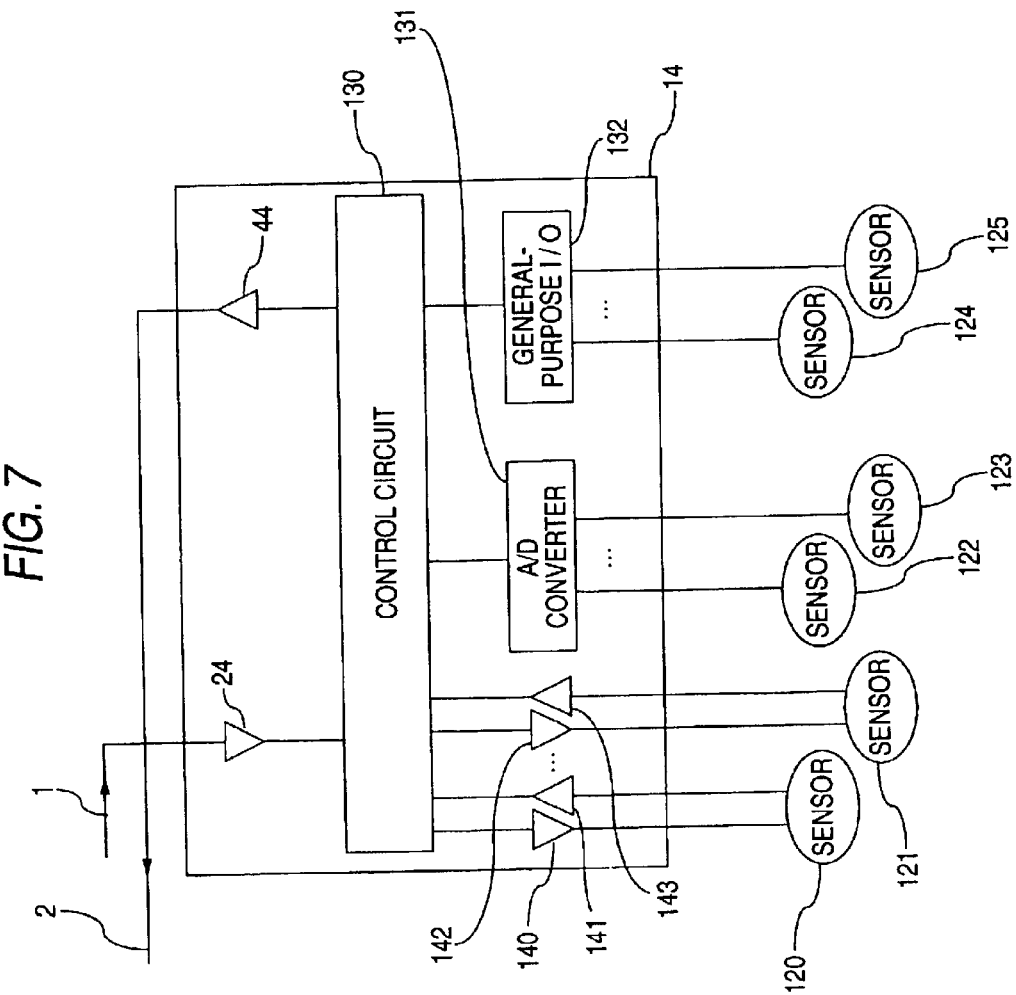
FIG. 7 is a diagram to show the configuration of a sensor control unit of the numerical control system according to the fourth embodiment of the invention.

The sensor control unit 14 is configured as shown in FIG. 7. That is, the sensor control unit 14 acquires detection data of sensors 120 and 121 by serial communications using transmission sections 140 and 142 and reception sections 141 and 143, acquires detection data of sensors 122 and 123 by analog input with an A/D converter 131, acquires detection data of sensors 124 and 125 with general-purpose I/O input 132, converts the detection data and the status of each sensor into an outputable data format to the communication line 2 by a control circuit 130, and upward transmits the provided data by the transmission section 44. That is, the sensor control unit 14 is configured so that it can input data detected by any type of sensor. The control circuit 130 receives data over the downward communication line at the reception section 24, executes an initialization command such as a communication timing setting command transmitted through the transmission section 20 and the communication line 1 from the numerical control unit 10, and executes a command such as offset correction to the sensor transmitted through the transmission section 31 and the communication line 1 from the drive control unit 12.

Numeral 100 denotes a servomotor controlled by the drive control unit 12 and numeral 101 denotes an encoder attached to a shaft end of the servomotor 100. Output of the encoder is input to the drive control unit 12. Numeral 102 denotes a ball screw driven by the servomotor 100 and numeral 106 denotes a table of a machine tool, etc., moved as the ball screw 102 is driven.

Numeral 110 denotes a scale encoder attached to a machine and output of the encoder is input to the drive control unit 12. Numeral 112 denotes an acceleration sensor for detecting the acceleration of the table 106 and output of the sensor is input to the sensor control unit 14. The detection data of the acceleration sensor 112 is input through the reception section 141 of the sensor control unit 14 in FIG. 7. Numerals 113 and 114 denote limit switches attached to ends of the machine; when the table 106 exceeds the moving range for some reason, the limit switch is turned on. Output of the limit switch is input to the sensor control unit 14. The detection data of the limit switch 113, 114 is input through the general-purpose I/O 132 of the sensor control unit 14 in FIG. 7.

Figure 8:
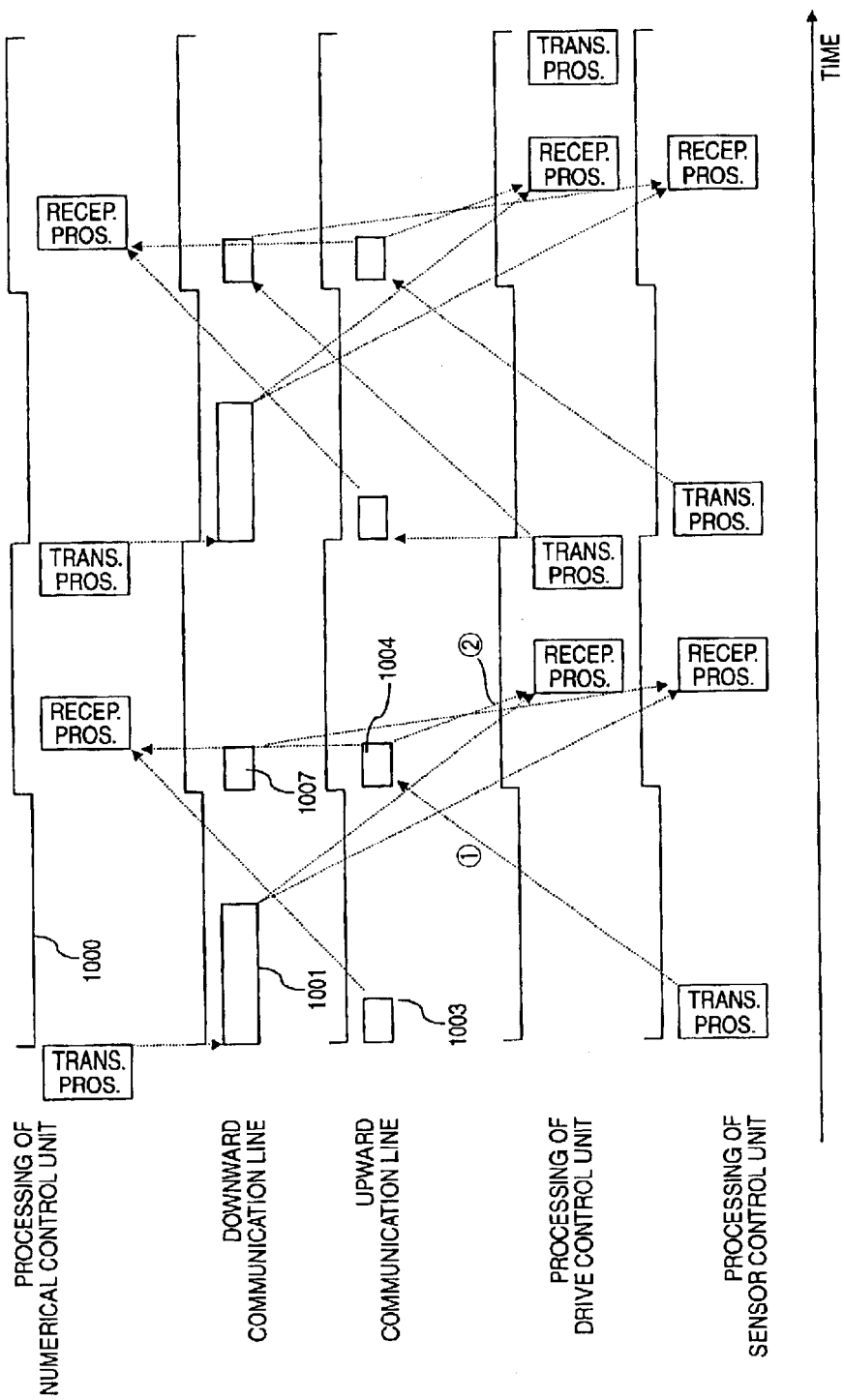
FIG. 8 is a control flow diagram of the numerical control system according to the fourth embodiment of the invention.

The numerical control system according to the fourth embodiment is configured as described above and operates as follows:

The numerical control unit 10 uses the transmission section 20 to transmit a control command 1001 to the downward communication line 1 every communication period 1000 of the numerical control unit, as shown in FIG. 8. The drive control unit 12 inputs the control command 1001 transmitted from the numerical control unit 10 and received at the reception section 22, the detection data of the encoder 101 attached to the motor shaft end, and the detection data of the scale encoder 110 attached to the machine end and performs servo control of the servomotor 100. The servomotor 100 drives the ball screw 102 for moving the table 106 on the ball screw 102 as commanded. At this time, the sensor control unit 14 is controlled based on data 1001 and 1007 transmitted from the numerical control unit 10 and the drive control unit 12 and received at the reception section 24, inputs acceleration data 1004 of the table 106 from the acceleration sensor 112, and transmits the data from the transmission section 44 to the upward communication line 2 in synchronization with the control period of the numerical control unit 10 (① in FIG. 8). The drive control unit 12 receives the acceleration data 1004 transmitted to the upward communication line 2 directly at the reception section 51 not via the numerical control unit 10 (② in FIG. 8) and reflects the acceleration data 1004 on control of the servomotor 100. That is, the acceleration data is integrated to the speed at the machine end and the difference between the motor speed the speed at the machine end is fed back for compensation, thereby improving responsivity.

At the control time, if the table 106 exceeds the moving range for some reason and the limit switch 113 or 114 is turned on, the sensor control unit 14 inputs an on signal 1004 and transmits the signal from the transmission section 44 to the upward communication line 2 in synchronization with the control period 1000 of the numerical control unit 10. The drive control unit 12 receives the on signal 1004 of the limit switch 113 or 114 transmitted to the upward communication line 2 directly at the reception section 51 not via the numerical control unit 10 and stops the servomotor 100.

The drive control unit 12 transmits diagnosis data of the current state, a warning, an alarm, etc., and detection data 1003 of position, speed, electric current, etc., detected when the servomotor 100 is controlled to the upward communication line 2 by the transmission section 42 every communication period 1000 of the numerical control unit 10.

The transmission timings of the data 1003 transmitted from the drive control unit 12 to the upward communication line 2 and the data 1004 transmitted from the sensor control unit 14 to the upward communication line 2 are scheduled so that the data 1003 and the data 1004 do not collide with each other within the communication period 1000 defined by the numerical control unit 10 as shown in FIG. 8, and the data 1003 and the data 1004 can be transmitted to the upward communication line 2 without colliding with each other, so that the drive control unit 12 can receive the data 1004 from the sensor control unit 14 and the numerical control unit 10 can also receive the data 1003 from the drive control unit 12 and the data 1004 from the sensor control unit 14 at the reception section 40 and can monitor the data.

As described above, according to the fourth embodiment, the detection data of the acceleration sensor 112 can be reflected on the servo control within one communication period, machine vibration can be suppressed, and the positioning accuracy can be improved. Since the drive control unit 12 can directly input the detection data of the limit switch 113, 114 not via the numerical control unit 10, it is made possible to stop the system without any delay caused by the intervention of any other unit at the emergency time at which the table 106 exceeds the moving range, for example.

The need for providing the drive control unit 12 with dedicated connectors and circuits for receiving the data of the acceleration sensor 112 and the limit switches 113 and 114 is eliminated and by extension a general-purpose unit can be used as the drive control unit.

Also in the embodiment, if the communication period of each of the drive control unit 12 and the sensor control unit 14 is set to one-nth of the communication period 1000 of the numerical control unit 10 (n is an integer), it is made possible for the drive control unit 12 to input the detection data of the sensors independently of the communication period 1000 of the numerical control unit 10 and by extension the positioning accuracy can be furthermore improved and it is made possible to stop the system more rapidly at the emergency time.

In the embodiment, the numerical control system for controlling one motor by one drive control unit has been described. However, if the two motors for driving the table 106 are controlled by the drive control units and only one acceleration sensor 112 for detecting the acceleration of the table 106 is attached to the table 106 (only one detection data of the acceleration sensor exists) as described in the first embodiment, the second embodiment, etc., the drive control units can receive the detection data of the acceleration sensor almost at the same time via the sensor control unit 14 and the upward communication line 2. Thus, in the configuration as described above, providing the sensor control unit 14 is furthermore effective for suppressing machine vibration and improving the positioning accuracy. In this connection, in the configuration as described above, if the sensor control unit 14 is not provided, the detection data of the acceleration sensor needs to be sent via one drive control unit to the other and thus each drive control unit receives the detection data of the acceleration sensor with a delay and by extension the effect of feedback compensation using the detection data of the acceleration sensor is weakened.

In the fourth embodiment, the numerical control system wherein the sensor control unit 14 is connected downward from the drive control unit 12 and the detection data is transmitted to the drive control unit 12 through the communication line 2 has been described. However, if the sensor control unit 14 is connected upward from the drive control unit 12, the detection data is transmitted to the drive control unit 12 through the communication line 1, needless to say.

Fifth Embodiment

Next a fifth embodiment of the invention will be discussed with FIGS. 7, 9, and 10.

Figure 9:
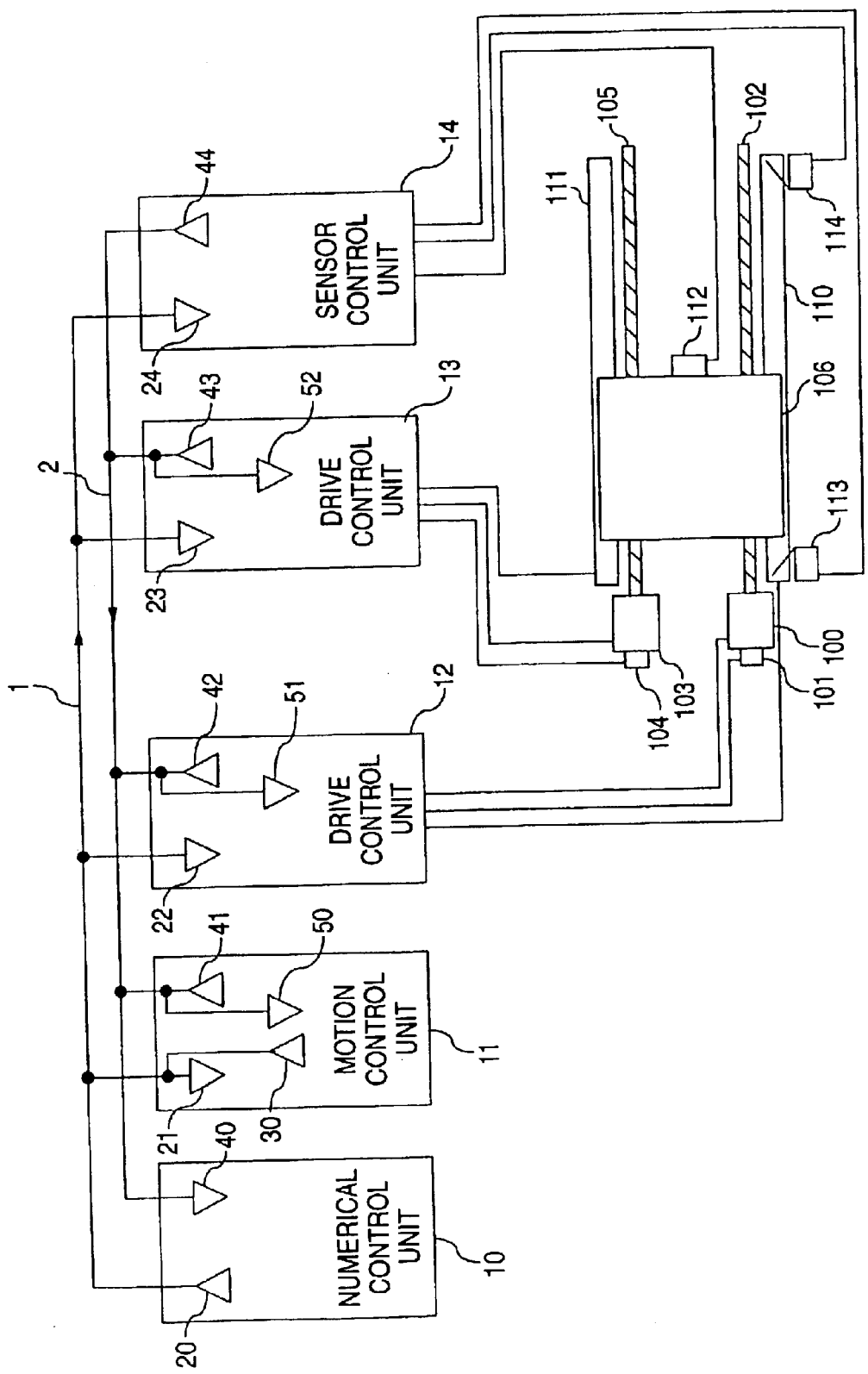
FIG. 9 is a diagram to show the configuration of a numerical control system according to a fifth embodiment of the invention.

FIG. 9 is a diagram to show the configuration of a numerical control system, a kind of servomotor drive control system, with one numerical control unit, one motion control unit, one sensor control unit, and two drive control units for feeding back detection data of the sensor control unit and performing synchronous operation. FIG. 10 is a control flow chart of the numerical control system (timing chart of transmission and reception data).

In FIG. 9, numeral 10 denotes a numerical control unit of a command unit having a transmission section 20 connected to a downward communication line 1 (first communication line) and a reception section 40 connected to an upward communication line 2 (second communication line). Numeral 11 denotes a motion control unit for calculating a synchronization error between two axes and generating a synchronization error correction control command, the motion control unit 11 having a transmission section 30 and a reception section 21 connected to the downward communication line 1 and a transmission section 41 and a reception section 50 connected to the upward communication line 2. The numerical control unit 10 and the motion control unit 11 have their respective calculation CPUs. Numeral 12 denotes a master drive control unit having a reception section 22 connected to the downward communication line 1 and a transmission section 42 and a reception section 51 connected to the upward communication line 2. Numeral 13 denotes a slave drive control unit for synchronously operating with the drive control unit 12, the drive control unit 13 having a reception section 23 connected to the downward communication line 1 and a transmission section 43 and a reception section 52 connected to the upward communication line 2. Numeral 14 denotes a sensor control unit similar to the sensor unit described in detail with FIG. 7 in the fourth embodiment for controlling a plurality of sensors and managing transfer of data over the communication lines 1 and 2, the sensor control unit 14 having a reception section 24 connected to the downward communication line 1 and a transmission section 44 connected to the upward communication line 2. Numeral 100 denotes a servomotor controlled by the drive control unit 12 and numeral 101 denotes an encoder attached to a shaft end of the servomotor 100. Output of the encoder is input to the drive control unit 12. Numeral 102 denotes a ball screw driven by the servomotor 100, numeral 103 denotes a servomotor controlled by the drive control unit 13, and numeral 104 denotes an encoder attached to a shaft end of the servomotor 103. Output of the encoder is input to the drive control unit 13. Numeral 105 denotes a ball screw driven by the servomotor 103 and numeral 106 denotes a table of a machine tool, etc., moved as the ball screws 102 and 105 are driven. Numeral 110 denotes a scale encoder attached to a machine and output of the encoder is input to the drive control unit 12. Numeral 111 denotes a scale encoder attached to the machine and output of the encoder is input to the drive control unit 13. Numeral 112 denotes an acceleration sensor for detecting the acceleration of the table 106 and output of the sensor is input to the sensor control unit 14. Numerals 113 and 114 denote limit switches attached to ends of the machine; when the table 106 exceeds the moving range for some reason, the limit switch is turned on and output of the switch is input to the sensor control unit 14.

Figure 10:
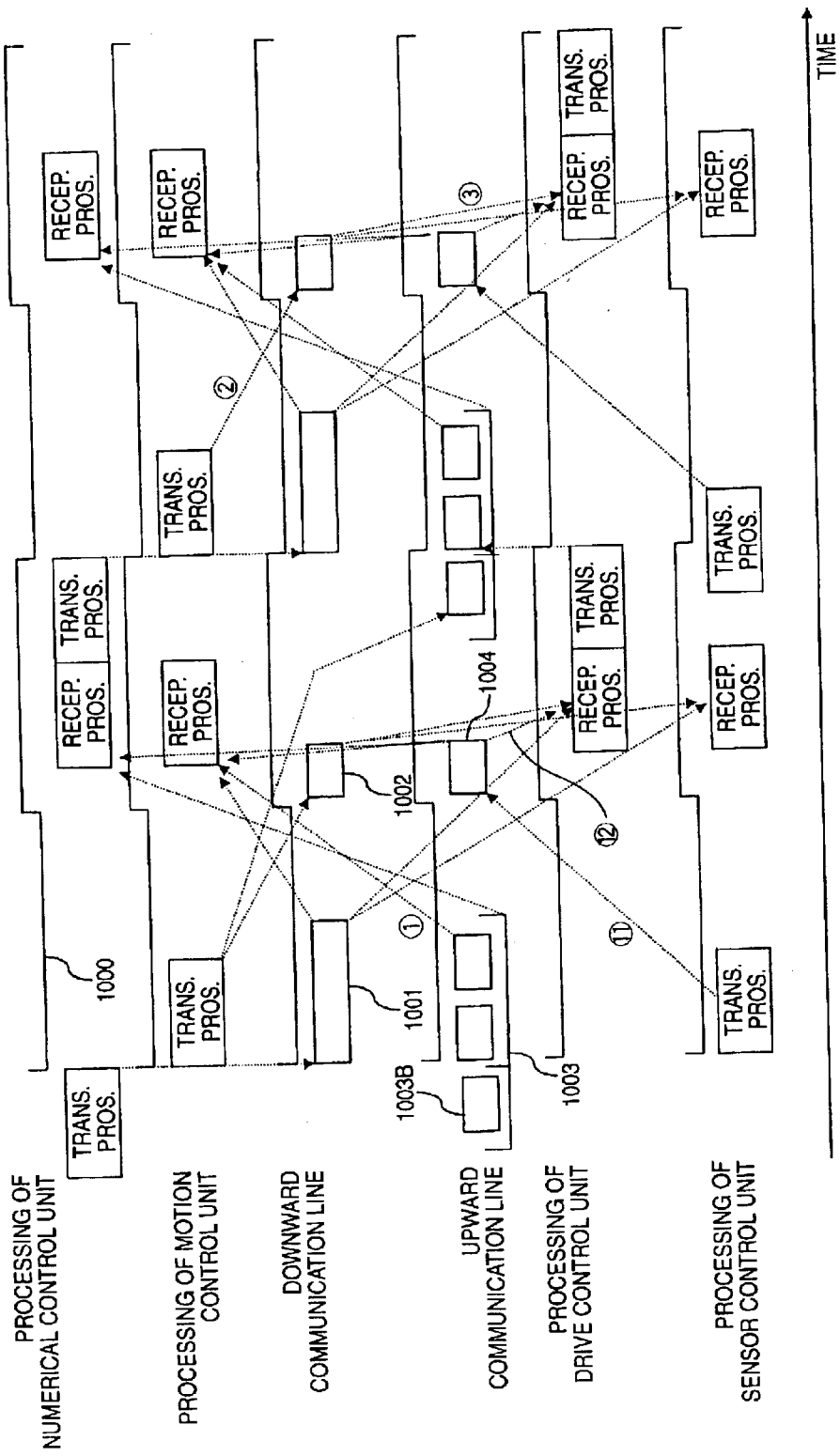
FIG. 10 is a control flow diagram of the numerical control system according to the fifth embodiment of the invention.

The numerical control system according to the fifth embodiment is configured as described above and operates as follows:

The numerical control unit 10 uses the transmission section 20 to transmit a control command 1001 to the downward communication line 1 every communication period 1000 of the numerical control unit, as shown in FIG. 10. The drive control unit 12 inputs the control command 1001 transmitted from the numerical control unit 10 and received at the reception section 22, the detection data of the encoder 101 attached to the motor shaft end, and the detection data of the scale encoder 110 attached to the machine end and performs servo control of the servomotor 100. The drive control unit 13 inputs the control command 1001 transmitted from the numerical control unit 10 and received at the reception section 23, the detection data of the encoder 104 attached to the motor shaft end, and the detection data of the scale encoder 111 attached to the machine end and performs servo control of the servomotor 103. The servomotors 100 and 103 drive the ball screws 102 and 105 for moving the table 106 on the ball screws 102 and 105 as commanded.

The drive control unit 12, 13 transmits diagnosis data of the current state, a warning, an alarm, etc., and detection data 1003 of position, speed, electric current, etc., detected when the servomotor 100, 103 is controlled to the upward communication line 2 by the transmission section 42, 43 every communication period of the numerical control unit 10 (①  in FIG. 10). At this time, the sensor control unit 14 is controlled based on data 1001 transmitted from the numerical control unit 10 and received at the reception section 24, inputs acceleration data 1004 of the table 106 from the acceleration sensor 112, and transmits the data from the transmission section 44 to the upward communication line 2 in synchronization with the control period of the numerical control unit 10 (⑪ in FIG. 10). The data transmitted from the drive control unit 12, 13 and the data transmitted from the sensor control unit 14 are scheduled so that they do not collide with each other within the communication period 1000 defined by the numerical control unit 10 as shown in FIG. 10, and they are transmitted to the upward communication line 2 without colliding with each other. In FIG. 10, numeral 1002 denotes a synchronization error correction control command prepared by the motion control unit 11 and transmitted to the drive control unit 12, 13 through the transmission section 30 and the downward communication line 1, and numeral 1003B denotes data of the synchronization error correction amount, the status of the motion control unit 11, etc., transmitted by the motion control unit 11 to the numerical control unit 10 through the transmission section 41 and the upward communication line 2.

As in the second embodiment, the motion control unit 11 receives the control command 1001 transmitted from the transmission section 20 of the numerical control unit 10 through the downward communication line 1 at the reception section 21, and receives the detection data 1003 of position, speed, electric current, etc., transmitted from the transmission sections 42 and 43 of the drive control units 12 and 13 through the upward communication line 2 at the reception section 50.

Since the data transmitted from the drive control units 12 and 13 is scheduled as described above, the motion control unit 11 can receive all the detection data 1003 of the drive control units 12 and 13 like the numerical control unit 10.

Based on the described reception data, the motion control unit 11 detects a lag from the control command of the two drive control units 12 and 13 performing synchronous control and a synchronization error between axes, generates a synchronization error correction control command 1002, and transmits the data from the transmission section 30 over the downward communication line 1 to the drive control unit 13 (②) in FIG. 10).

At the time, the synchronization error correction control command from the motion control unit 11 is scheduled as shown in FIG. 10 and is transmitted over the downward communication line 1 without colliding with the control command 1001 from the numerical control unit 10. The drive control unit 13 receives the synchronization error correction control command 1002 transmitted from the motion control unit 11 at the reception section 23 (③ in FIG. 10) and corrects the synchronization error.

The synchronization error correction control command 1002 generated by the motion control unit 11 is assigned the address corresponding to the address of the drive control unit 13 for transmission and thus is not received by the drive control unit 12 and can be received only by the drive control unit 13.

Correction processing (correction calculation, output processing of the calculation result to servomotor) based on the synchronization error correction control command 1002 received by the drive control unit 13 is executed while transmission/reception processing is not performed. The motion control unit 11 generates the synchronization error correction control command 1002 between reception processing and transmission processing although not shown.

Since the correction processing capability of the drive control unit 13 is already known, when the drive control unit 13 performs correction calculation, if it is determined that the calculation processing is not complete by the time another command comes from the numerical control unit 10, the drive control unit 13 performs correction only in the correction processing amount that can be completed by the time another command comes from the numerical control unit 10, and discards the remaining correction processing amount.

The motion control unit 11 transmits the data 1003B of the synchronization error correction amount, the status of the motion control unit 11, etc., from the transmission section 41 to the upward communication line 2. The numerical control unit 10 receives the data at the reception section 40 together with the data 1003 and 1004 transmitted from the drive control unit 12, 13 and the sensor control unit 14, monitors the data, and performs alarm processing for the drive control unit 12, 13, the sensor control unit 14, etc., as required.

The drive control unit 12, 13 receives the acceleration data 1004 transmitted from the sensor control unit 14 to the upward communication line 2 directly at the reception section 51 not via the numerical control unit 10 or the motion control unit 11 (⑫ in FIG. 10) and reflects the acceleration data 1004 on control of the servomotor 100, 103. That is, the acceleration data is integrated to the speed at the machine end and the difference between the motor speed the speed at the machine end is fed back for compensation, thereby improving responsivity.

At the control time, if the table 106 exceeds the moving range for some reason and the limit switch 113 or 114 is turned on, the sensor control unit 14 inputs an on signal and transmits the signal from the transmission section 44 to the upward communication line 2 in synchronization with the control period 1001 of the numerical control unit 10 (⑪ in FIG. 10). The drive control unit 12, 13 receives the on signal 1004 of the limit switch 113 or 114 transmitted to the upward communication line 2 directly at the reception section 51, 52 not via the numerical control unit 10 (⑫ in FIG. 10) and stops the servomotor 100, 103.

As described above, according to the fifth embodiment, the motion control unit 11 generates the synchronization error correction control command, whereby the calculation load on the numerical control unit 10 for preparing the synchronization error or the control processing load on the drive control unit 12 for correcting the synchronization error can be reduced.

For example, if the drive control unit 12 corrects the synchronization error as in the related art, in addition to the usual control calculation, the calculation load for correcting the synchronization error occurs on the drive control unit 12 and it may become impossible to complete synchronization error handling within one control period. However, according to the fifth embodiment, such a disadvantage is eliminated.

To increase the number of axes that can be controlled, a drive control unit having the same configuration as the drive control unit 12, 13 is added with the numerical control unit 10 and the drive control units 12 and 13 intact, whereby the number of axes to which synchronization error correction can be made can be increased and by extension it is easily made possible to make the system highly accurate.

The detection data of the acceleration sensor 112 can be reflected on the servo control within one communication period, machine vibration can be suppressed, and the positioning accuracy can be improved. At this time, the drive control units 12 and 13 can receive the detection data of the acceleration sensor 112 almost at the same time via the sensor control unit 14 and the upward communication line 2, so that the suppression effect of the machine vibration and the positioning accuracy are not degraded. In this connection, if the sensor control unit 14 is not provided, the detection data of the acceleration sensor 112 needs to be sent via one drive control unit 13 to the other drive control unit 12 and thus each drive control unit 12, 13 receives the detection data of the acceleration sensor 112 with a delay and by extension the effect of feedback compensation using the detection data of the acceleration sensor 112 is weakened.

Since the drive control unit 12 can directly input the detection data of the limit switch 113, 114 not via the numerical control unit 10, it is made possible to stop the system without any delay caused by the intervention of any other unit at the emergency time at which the table 106 exceeds the moving range, for example.

Further, the need for providing the drive control unit 12, 13 with dedicated connectors for receiving the data of the acceleration sensor 112 and the limit switches 113 and 114 is eliminated and by extension a general-purpose unit can be used as the drive control unit.

In the fifth embodiment, the data of the scale encoders 110 and 111 is input to the drive control units 12 and 13. However, after the data is input to the sensor unit 14, the data may be sent from the transmission section 44 to the upward communication line 2 corresponding to the control period of the numerical control unit 10 and may be received by the drive control units 12 and 13 through the reception sections 51 and 52. In doing so, the need for providing the drive control units 12 and 13 with dedicated connectors to the scale encoders 110 and 111 is eliminated.

In the embodiment described above, offset correction data of the sensor unit 14 may be transmitted from the numerical control unit 10 or the motion control unit 11.

In the fifth embodiment, the drive control unit 12 is the master and the drive control unit 13 is the slave, namely, if the drive control unit 12 of the master makes correction, what the control reference is becomes indistinct and the control becomes complicated and thus the drive control unit 13 of the slave makes synchronization error correction. However, only the drive control unit 12 of the master may make synchronization error correction.

The synchronization error correction can also be shared between the drive control unit 12 and the drive control unit 13.

In the fifth embodiment, the numerical control system wherein the sensor control unit 14 is connected downward from the drive control units 12 and 13 and the detection data is transmitted to the drive control units 12 and 13 through the communication line 2 has been described. However, if the sensor control unit 14 is connected upward from the drive control units 12 and 13, the detection data is transmitted to the drive control units 12 and 13 through the communication line 1, needless to say.

Sixth Embodiment

Next, a sixth embodiment of the invention will be discussed with FIGS. 9 and 11.

Figure 11:
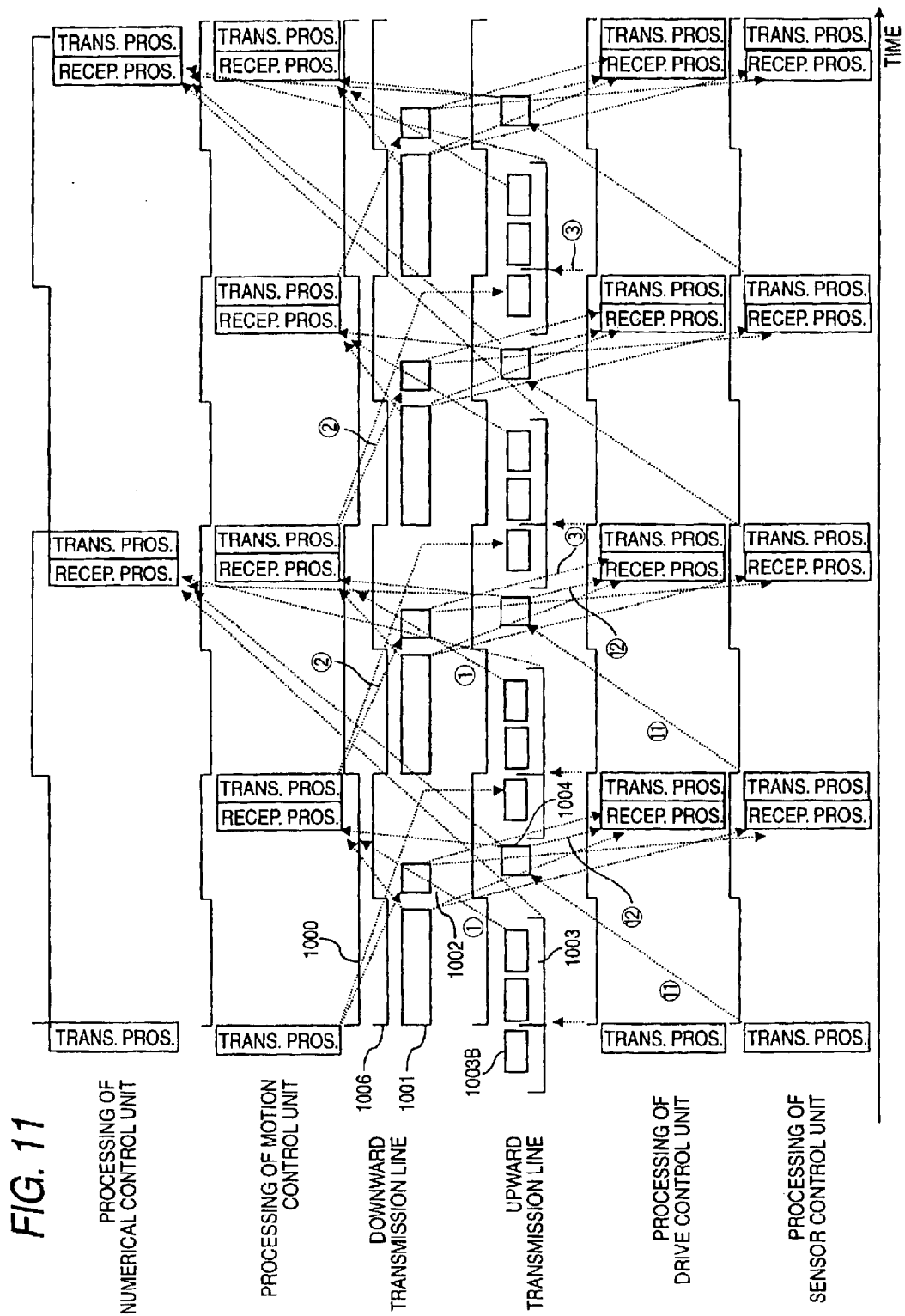
FIG. 11 is a control flow diagram of a numerical control system according to a sixth embodiment of the invention.

In the sixth embodiment, a numerical control system for performing synchronous operation in a similar configuration to that of the fifth embodiment shown in FIG. 9, a communication period 1006 of each of a motion control unit 11, drive control units 12 and 13, and a sensor control unit 14 is set to one-nth of a communication period 1000 of a numerical control unit 10 (n is an integer; in the embodiment, n=2) as the data transmission and reception timings of the units are shown in FIG. 11.

In the sixth embodiment, the contents of the data transmitted and received by the numerical control unit 10, the motion control unit 11, the drive control units 12 and 13, and the sensor control unit 14 are similar to those in the fifth embodiment.

Thus, the numerical control unit 10 transmits data in the communication period 1000 defined based on the control period of the numerical control unit 10 and each of the motion control unit 11, the drive control units 12 and 13, and the sensor control unit 14 transmits and receives data in the communication period 1006 of one half the communication period 1000 of the numerical control unit 10. Thus, while the numerical control unit 10 transmits one control command, the motion control unit 11 can receive twice detection data 1003 of the drive control unit 12, 13 transmitted through an upward communication line 2 and can transmit twice a synchronization error correction control command 1002 to the drive control unit 12, 13.

Likewise, during one communication period of the numerical control unit 10, the drive control unit 12, 13 can receive twice the synchronization error correction control command 1002 and can transmit twice the detection data 1003 through the upward communication line 2 and can receive twice sensor detection data 1004 from the sensor control unit 14.

Further, while the numerical control unit 10 transmits one control command 1001, the sensor control unit 14 can also transmit twice the sensor detection data 1004 to the drive control unit 12, 13.

As described above, according to the sixth embodiment, the motion control unit 11 generates the synchronization error correction control command, whereby the calculation load on the numerical control unit 10 for preparing the synchronization error or the control processing load on the drive control unit 12 for correcting the synchronization error can be reduced.

To increase the number of axes that can be controlled, a drive control unit having the same configuration as the drive control unit 12, 13 is added with the numerical control unit 10 and the drive control units 12 and 13 intact, whereby the number of axes to which synchronization error correction can be made can be increased and by extension it is easily made possible to make the system highly accurate.

Since the sensor information such as the detection data of the acceleration sensor 112 can be acquired independently of the control period of the numerical control unit 10, the suppression frequency of machine resonance can be raised and highly responsive machine positioning is made possible.

Since the drive control unit 12, 13 can directly input the detection data of the limit switch 113, 114 not via the numerical control unit 10 and moreover can acquire the detection data independently of the control period of the numerical control unit 10, it is made possible to stop the system without any delay caused by the intervention of any other unit at the emergency time at which the table 106 exceeds the moving range, for example.

The need for providing the drive control unit 12, 13 with dedicated connectors for receiving the data of the acceleration sensor 112 and the limit switches 113 and 114 is eliminated and by extension a general-purpose unit can be used as the drive control unit.

Further, the synchronization error correction control command 1002 transmitted by the motion control unit 11 is not bound by the control period of the numerical control unit 10 and it is made possible to suppress the synchronization error amount caused by a disturbance like an impulse in a short time.

In the sixth embodiment, the communication period 1006 of each of the motion control unit 11, the drive control units 12 and 13, and the sensor control unit 14 is set to one half the communication period 1000 of the numerical control unit 10. If the communication period is furthermore shortened, for example, to one-third or one-fourth, it is made possible to suppress the synchronization error amount caused by a disturbance like an impulse in a shorter time.

Seventh Embodiment

Next a seventh embodiment of the invention will be discussed with FIGS. 12 and 13.

Figure 12:
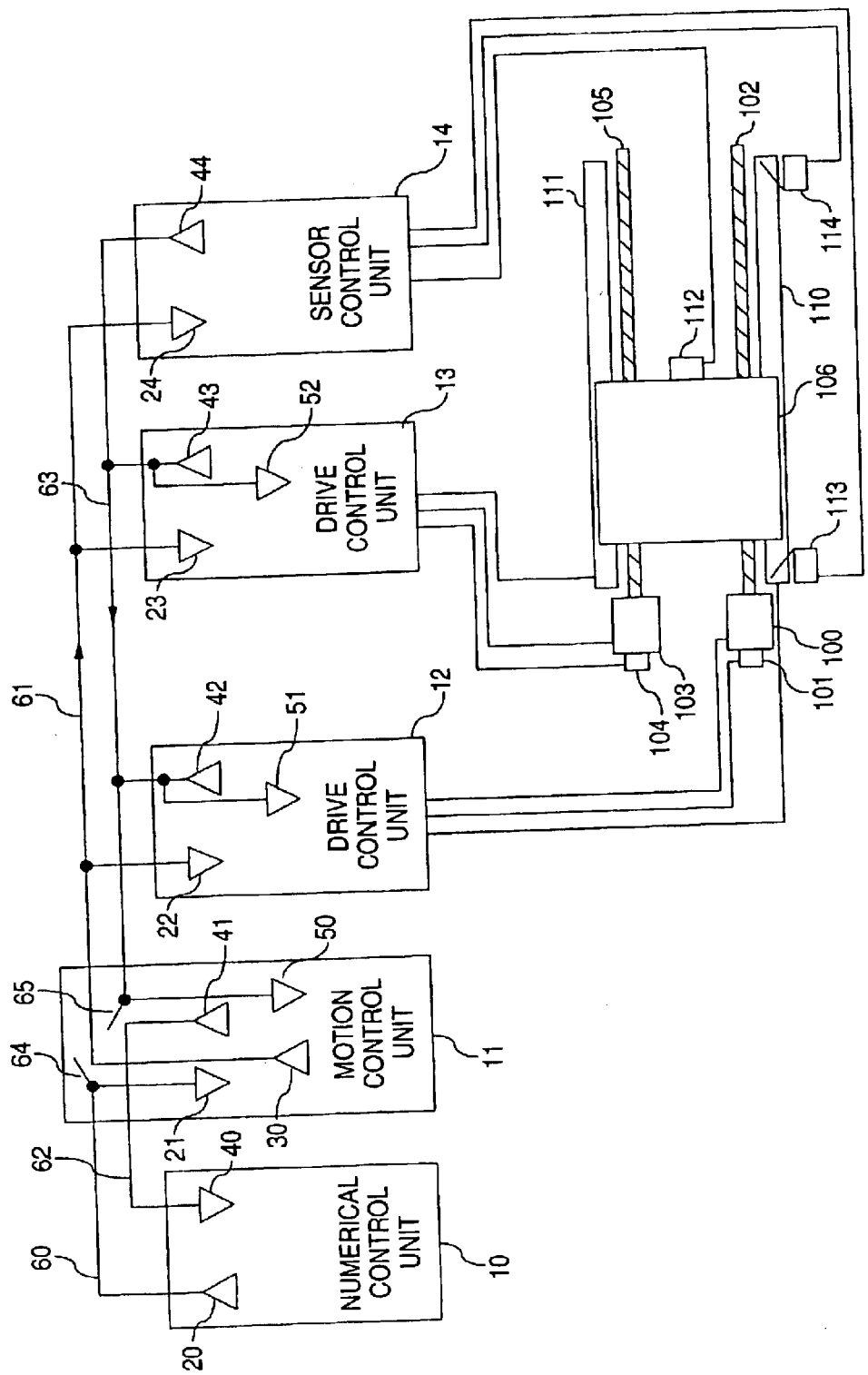
FIG. 12 is a diagram to show the configuration of a numerical control system according to a seventh embodiment of the invention.

FIG. 12 is a diagram to show the configuration of a numerical control system, a kind of servomotor drive control system, with one numerical control unit, one motion control unit, one sensor control unit, and two drive control units for feeding back detection data of the sensor control unit and performing synchronous operation. FIG. 13 is a control flow chart of the numerical control system (timing chart of transmission and reception data).

In the seventh embodiment, as shown in FIG. 12, the motion control unit 11 is provided with internal contacts 64 and 65 for separating in the motion control unit 11 the downward and upward communication lines 1 and 2 for connecting the numerical control unit 10 having a long communication period, the motion control unit 11, the drive control units 12 and 13, and the sensor control unit 14 described in the fifth embodiment (FIG. 9), whereby the drive control units 12 and 13 and the sensor control unit 14 each having a short communication period are separated from the numerical control unit 10 having a long communication period. The contacts 64 and 65 are open at the normal operation time and are closed only at the initialization time before the normal operation.

To intervene in data transfer between the numerical control unit 10 having a long communication period and the drive control units 12 and 13 and the sensor control unit 14 each having a short communication period as the units are separated, the reception section 21 of the motion control unit 11 is connected to a downward communication line 60 connected to the transmission section 20 of the numerical control unit 10 and the transmission section 41 is connected to an upward communication line 62 connected to the reception section of the numerical control unit 10 and the transmission section 30 of the motion control unit 11 is connected to a downward communication line 61 connected to the reception sections 22, 23, and 24 of the drive control units 12 and 13 and the sensor control unit 14 and further the transmission section 50 is connected to an upward communication line 63 connected to the transmission sections 42, 43, and 44 of the drive control units 12 and 13 and the sensor control unit 14. That is, the motion control unit 11 is connected to other units in a daisy chain way.

Further, the communication period between the motion control unit 11 and the drive control units 12 and 13 and the sensor control unit 14 is set to one-nth of the communication period between the numerical control unit 10 and the motion control unit 11 (n is an integer; in the embodiment, n=2).

Other components are similar to those of the fifth embodiment.

Figure 13:
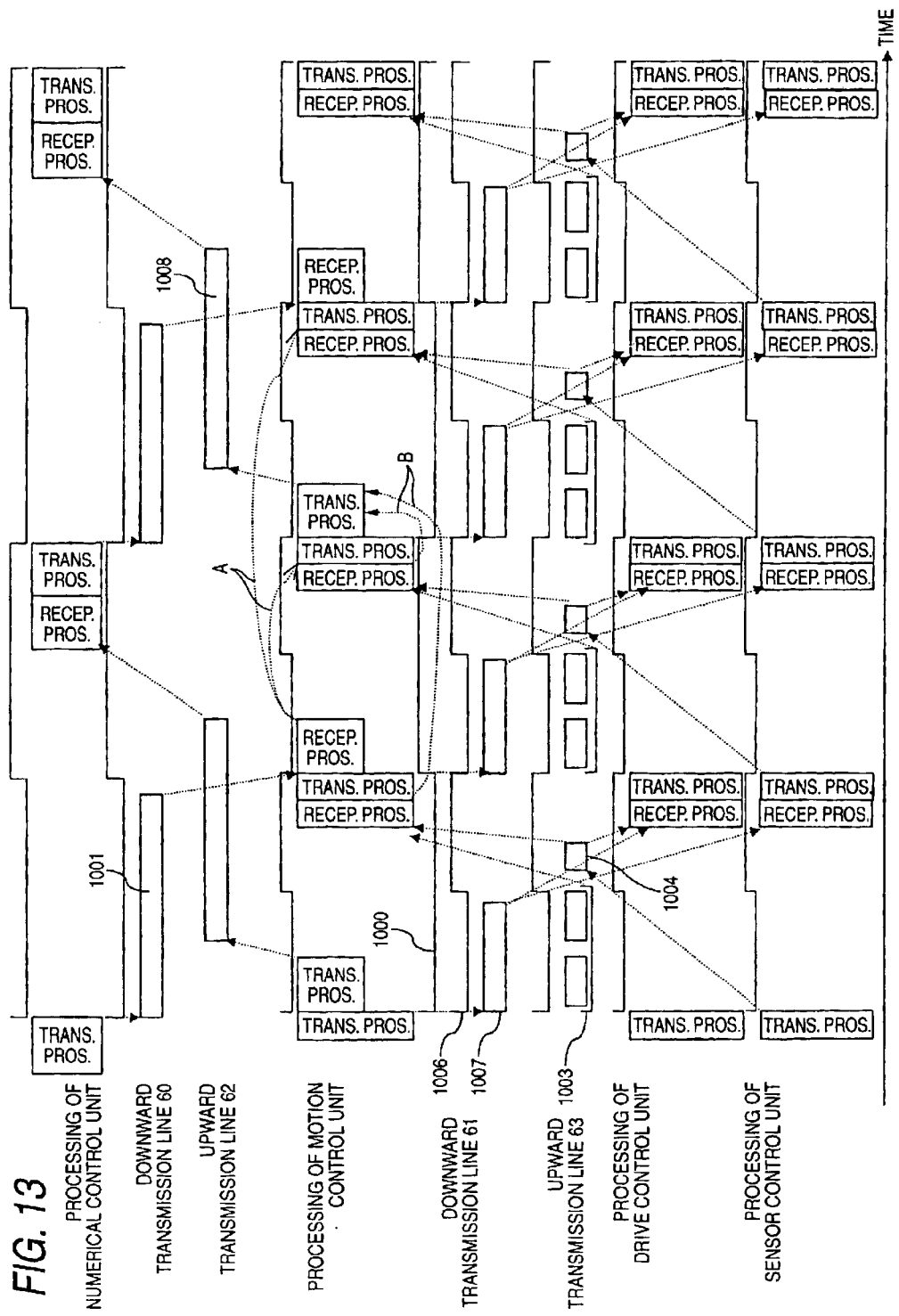
FIG. 13 is a control flow diagram of the numerical control system according to the seventh embodiment of the invention.
Figure 14:
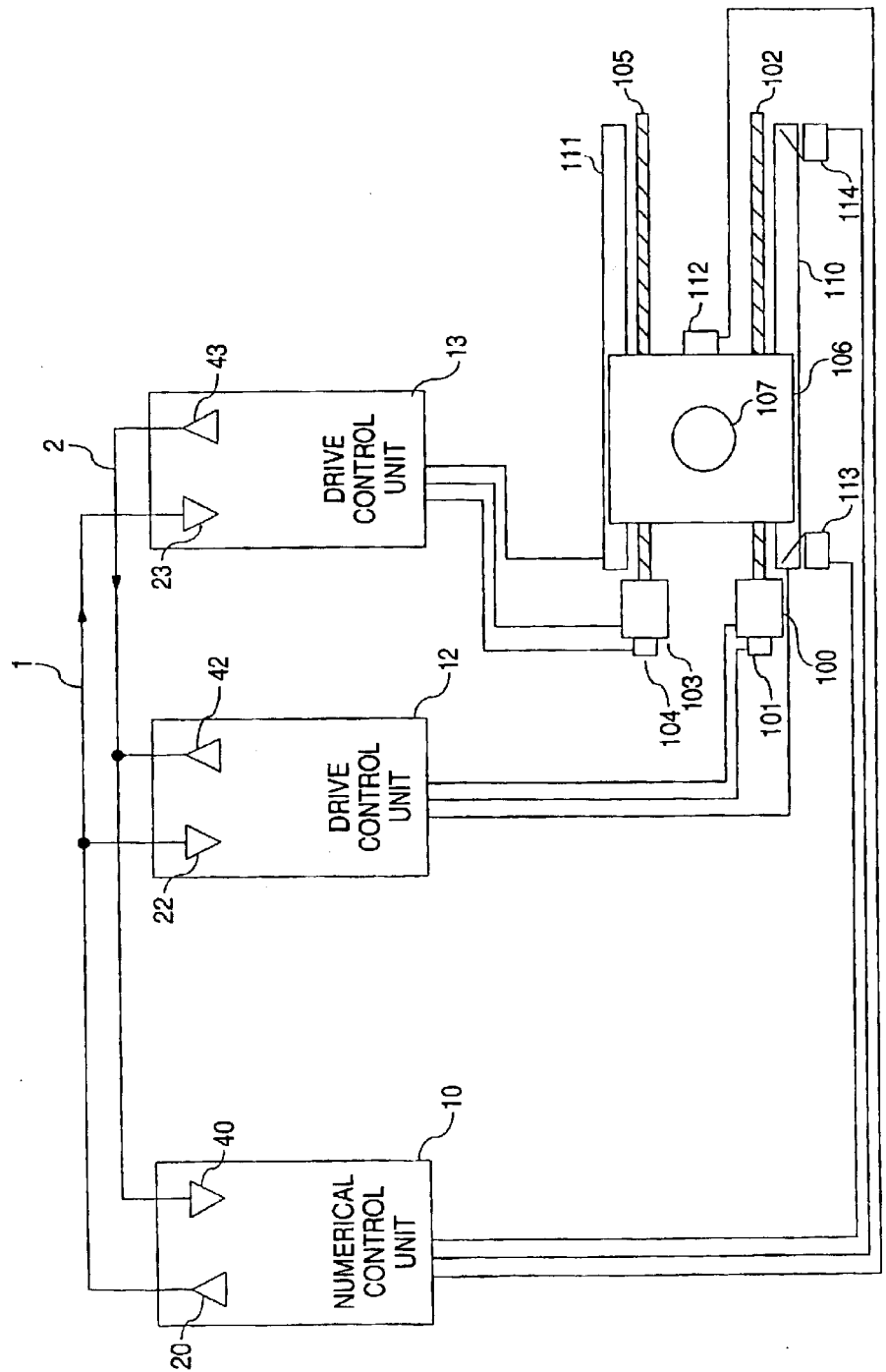
FIG. 14 is a diagram to show the configuration of a numerical control system in a related art.
Figure 15:
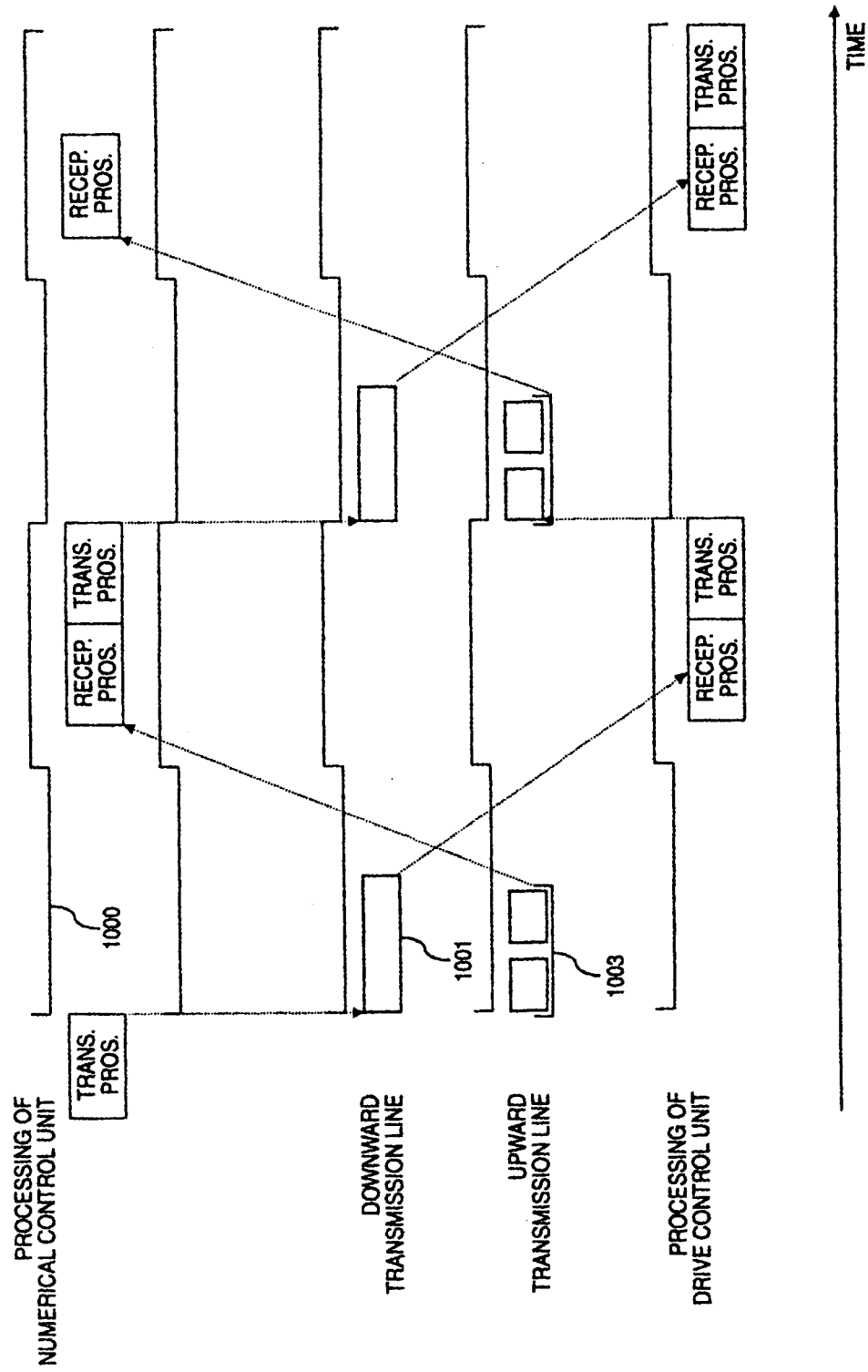
FIG. 15 is a control flow diagram of the numerical control system in the related art.
Figure 16:
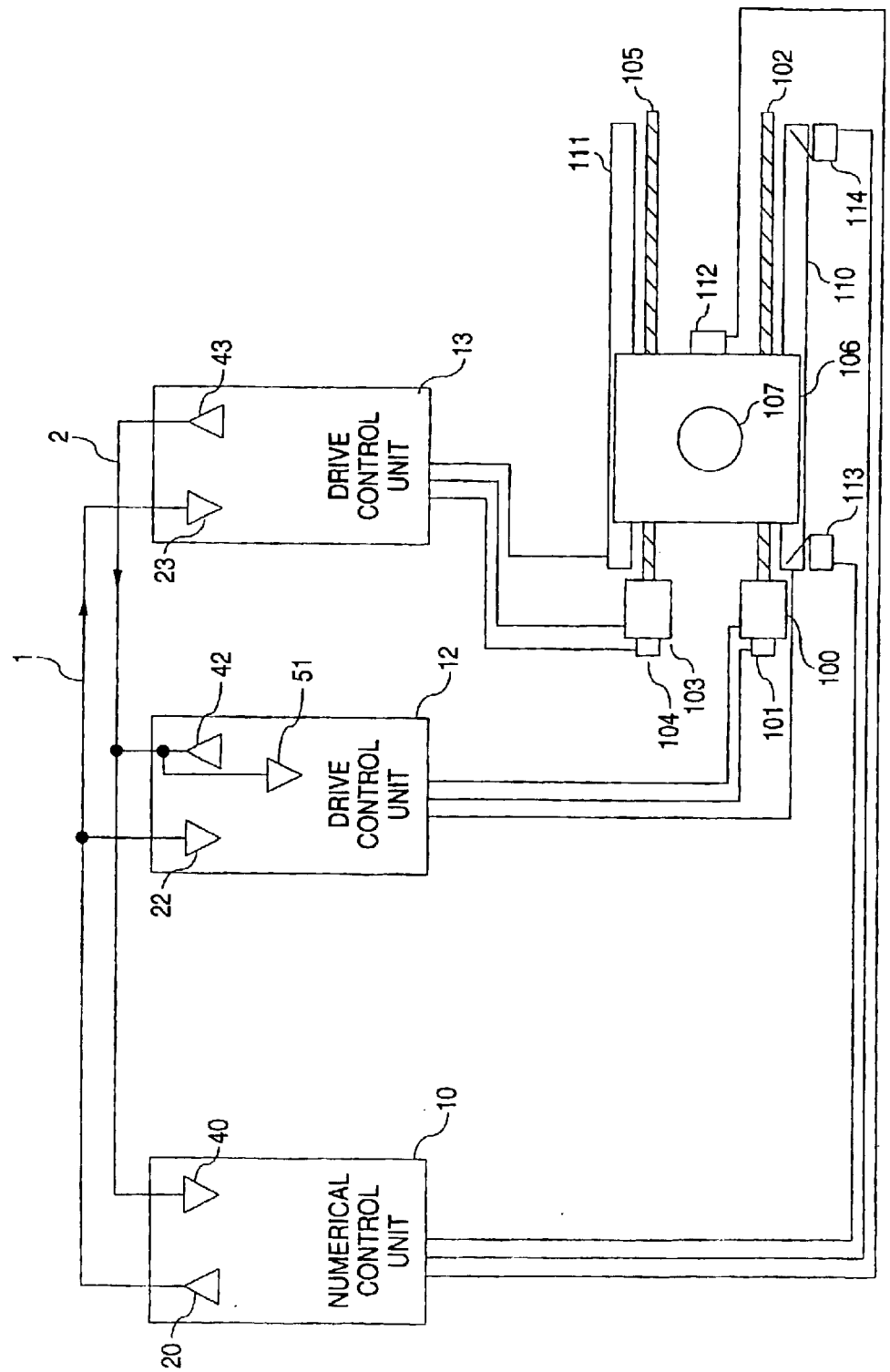
FIG. 16 is a diagram to show the configuration of a numerical control system in another related art.

The numerical control system according to the seventh embodiment is configured as described above and operates as follows:

As shown in FIG. 13, with the contacts 64 and 65 open, the numerical control unit 10 transmits a control command 1001 of the motion 11 control unit and a control command 1001 of position, speed, electric current, etc., for two control periods in the drive control unit 12, 13 from the transmission section 20 to the downward communication line 60 in accordance with the control period 1000 of the numerical control unit.

The motion control unit 11 receives the control command 1001 by the reception section 21, divides the command from the numerical control unit 10 to the drive control unit 12, 13 into two pieces so as to match the control period 1006 of the drive control unit 12, 13 (A in FIG. 13), again prepares, and transmits from the transmission section 30 to the downward communication line 61.

At this time, the motion control unit 11 receives detection data 1003 of position, speed, electric current, etc., from the drive control unit 12, 13, transmitted to the upward communication line 63 at the reception section 50, detects a lag from the control command of the two drive control units 12 and 13 performing synchronous control and a synchronization error between axes, generates a synchronization error correction control command, and transmits the data together with the control command from the numerical control unit 10 from the transmission section 30 through the downward communication line 61 to each drive control unit 12, 13 (1007 in FIG. 13).

The motion control unit 11 also receives the detection data 1003 of position, speed, electric current, etc., from the drive control unit 12, 13, transmitted to the upward communication line 63, diagnosis data 1003 of the current state, a warning, an alarm, etc., and sensor detection data 1004 from the sensor control unit 14 at the reception section 50, buffers the data, the synchronization error correction amount, and the diagnosis data of the current state, a warning, an alarm, etc., of the motion control unit 11 for two control periods 1006 of the drive control unit 12, 13 (B in FIG. 13), and transmits from the transmission section 41 to the upward communication line 62 in accordance with the control period 1000 of the numerical control unit 10 (1008 in FIG. 13). The numerical control unit 10 receives the transmission data 1008 from the motion control unit 11 by the reception section 40 and monitors the data. Any other operation is similar to that of the sixth embodiment.

As described above, according to the seventh embodiment, the communication lines 60 and 62 connected to the numerical control unit 10 can be used only to transfer data between the numerical control unit 10 at low communication speed and the motion control unit 11, and the communication lines 61 and 63 connected to the drive control units 12 and 13, etc., at high communication speed can be used only to transfer data between the motion control unit 11, the drive control units 12 and 13, and the sensor control unit 14 and therefore the transmission efficiency of the communication lines can be improved.

The motion control unit 11 generates the synchronization error correction control command, whereby the calculation load on the numerical control unit 10 for preparing the synchronization error or the control processing load on the drive control unit 12 for correcting the synchronization error can be reduced.

To increase the number of axes that can be controlled, a drive control unit having the same configuration as the drive control unit 12, 13 is added with the numerical control unit 10 and the drive control units 12 and 13 intact, whereby the number of axes to which synchronization error correction can be made can be increased and by extension it is easily made possible to make the system highly accurate.

Since the sensor information such as the detection data of the acceleration sensor 112 can be acquired independently of the control period of the numerical control unit 10, the suppression frequency of machine resonance can be raised and highly responsive machine positioning is made possible.

Since the drive control unit 12, 13 can directly input the detection data of limit switch 113, 114 not via the numerical control unit 10 and moreover can acquire the detection data independently of the control period of the numerical control unit 10, it is made possible to stop the system without any delay caused by the intervention of any other unit at the emergency time at which a table 106 exceeds the moving range, for example.

The need for providing the drive control unit 12, 13 with dedicated connectors for receiving the data of the acceleration sensor 112 and the limit switches 113 and 114 is eliminated and by extension a general-purpose unit can be used as the drive control unit.

Further, the synchronization error correction control command 1002 transmitted by the motion control unit 11 is not bound by the control period of the numerical control unit 10 and it is made possible to suppress the synchronization error amount caused by a disturbance like an impulse in a short time.

In the seventh embodiment, the communication period 1006 of each of the motion control unit 11, the drive control units 12 and 13, and the sensor control unit 14 is set to one half the communication period 1000 of the numerical control unit 10. If the communication period is furthermore shortened, for example, to one-third or one-fourth, it is made possible to suppress the synchronization error amount caused by a disturbance like an impulse in a shorter time.

In the embodiment described above, offset correction data of the sensor unit 14 may be transmitted from the motion control unit 11, etc.

In the seventh embodiment, the numerical control system provided with the sensor control unit 14 has been described, but the concept of the seventh embodiment can also be applied to a numerical control system provided with no sensor control unit 14, for example, the numerical control system shown in FIG. 3, needless to say.

In the embodiments described above, the numerical control system using the numerical control unit as the command unit has been described as the servomotor drive control system, but the invention can also be applied to the servomotor drive control system of the type wherein the numerical control unit is not used as the command unit.

As described above, according to the invention, in the servomotor drive control system comprising a command unit of a numerical control unit, etc., a plurality of drive control units for controlling drive of servomotors, a first communication line for transmitting data of a control command, etc., in a direction of the above-mentioned plurality of drive control units from the above-mentioned command unit, and a second communication line for transmitting data of detection data, etc., in a direction of the above-mentioned command unit from the above-mentioned plurality of drive control units, wherein data is transferred between the above-mentioned plurality of drive control units using the above-mentioned communication lines, whereby the above-mentioned servomotors are synchronously controlled, the communication period between the above-mentioned drive control units is set to one-nth of the communication period of the above-mentioned command unit (n is an integer). Thus, the synchronization error correction control command from one drive control unit to the other can be transmitted at high speed independently of the communication period of the command unit, so that the calculation load for preparing the synchronization error correction control command is not imposed on the command unit and moreover it is made possible to suppress the synchronization error amount caused by a disturbance like an impulse in a short time.

According to the invention, in the servomotor drive control system comprising a command unit of a numerical control unit, etc., a plurality of drive control units for controlling drive of servomotors, a first communication line for transmitting data of a control command, etc., in a direction of the above-mentioned plurality of drive control units from the above-mentioned command unit, and a second communication line for transmitting data of detection data, etc., in a direction of the above-mentioned command unit from the above-mentioned plurality of drive control units, wherein the above-mentioned plurality of drive control units synchronously control the servomotors, a motion control unit is placed between the above-mentioned command unit and the above-mentioned plurality of drive control units for receiving the control command given to the above-mentioned plurality of drive control units, transmitted through the above-mentioned first communication line from the above-mentioned command unit, receiving the detection data transmitted through the above-mentioned second communication line from the above-mentioned plurality of drive control units, generating a synchronization error correction control command based on the received control command and detection data mentioned above, and transmitting the generated synchronization error correction control command to the above-mentioned drive control units through the above-mentioned first communication line, and the above-mentioned drive control units receive the control command from the above-mentioned command unit and the synchronization error correction control command from the above-mentioned motion control unit, transmitted through the above-mentioned first communication line and control the servomotors based on the received control command and synchronization error correction control command. Thus, the calculation load on the command unit for preparing the synchronization error or the control processing load on the drive control unit for correcting the synchronization error can be reduced.

To increase the number of axes that can be controlled, a drive control unit having the same configuration as the drive control unit is added with the command unit and the drive control units intact, whereby the number of axes to which synchronization error correction can be made can be increased and by extension it is easily made possible to make the system highly accurate.

In the invention, in the above-mentioned servomotor drive control system, the communication period between the above-mentioned motion control unit and the above-mentioned drive control units is set to one-nth of the communication period of the above-mentioned command unit (n is an integer). Thus, the synchronization error correction control command transmitted by the motion control unit is made independent of the control period of the command unit and by extension it is made possible to suppress the synchronization error amount caused by a disturbance like an impulse in a shorter time.

According to the invention, in the servomotor drive control system comprising a command unit of a numerical control unit, etc., a plurality of drive control units for controlling drive of a servomotor, a first communication line for transmitting data of a control command, etc., in a direction of the above-mentioned plurality of drive control units from the above-mentioned command unit, and a second communication line for transmitting data of detection data, etc., in a direction of the above-mentioned plurality of command units from the above-mentioned drive control unit, a sensor control unit is provided for inputting detection data of a sensor and transmitting the data directly to the above-mentioned plurality of drive control units through the above-mentioned first or second communication line, and the above-mentioned plurality of drive control units receives the control command from the above-mentioned command unit transmitted through the above-mentioned first communication line and the detection data of the sensor transmitted through the above-mentioned first or second communication line, and controls the servomotor based on the received control command and detection data of the sensor. Thus, the detection data of the sensor can be reflected on the servo control within one communication period, machine vibration can be suppressed, and the positioning accuracy can be improved. Since the drive control unit can directly input the detection data of the sensor not via the command unit, it is made possible to stop the system without any delay caused by the intervention of any other unit at the emergency time at which the table exceeds the moving range, for example.

The need for providing the drive control unit with dedicated connectors and circuits for receiving the data of the sensors of the acceleration sensor, the limit switches, etc., is eliminated and by extension a general-purpose unit can be used as the drive control unit.

In the invention, in the above-mentioned servomotor drive control system, the communication period between the above-mentioned drive control unit and the above-mentioned sensor control unit is set to one-nth of the communication period of the above-mentioned command unit (n is an integer). Thus, it is made possible for the drive control unit to receive the detection data of the sensors independently of the control period of the command unit and thus the positioning accuracy can be furthermore improved and it is made possible to stop the system more rapidly at the emergency time.

According to the invention, in the servomotor drive control system comprising a command unit of a numerical control unit, etc., a plurality of drive control units for controlling drive of servomotors, a first communication line for transmitting data of a control command, etc., in a direction of the above-mentioned plurality of drive control units from the above-mentioned command unit, and a second communication line for transmitting data of detection data, etc., in a direction of the above-mentioned command unit from the above-mentioned plurality of drive control units, wherein the above-mentioned plurality of drive control units synchronously control the servomotors, a sensor control unit is provided for inputting detection data of a sensor and transmitting the data directly to the above-mentioned drive control units through the above-mentioned first or second communication line, a motion control unit is placed between the above-mentioned command unit and the above-mentioned plurality of drive control units for receiving the control command given to the above-mentioned plurality of drive control units, transmitted through the above-mentioned first communication line from the above-mentioned command unit, receiving the detection data transmitted through the above-mentioned second communication line from the above-mentioned plurality of drive control units, generating a synchronization error correction control command based on the received control command and detection data mentioned above, and transmitting the generated synchronization error correction control command to the above-mentioned drive control units through the above-mentioned first communication line, and the above-mentioned drive control units receive the control command from the above-mentioned command unit transmitted through the above-mentioned first communication line, the synchronization error correction control command from the above-mentioned motion control unit transmitted through the above-mentioned first communication line, and the detection data of the sensor transmitted through the above-mentioned first or second communication line, and control the servomotors based on the received control command, synchronization error correction control command, and detection data of the sensor. Thus, the motion control unit generates the synchronization error correction control command, whereby the calculation load on the command unit for preparing the synchronization error or the control processing load on the drive control unit for correcting the synchronization error can be reduced.

To increase the number of axes that can be controlled, a drive control unit having the same configuration as the drive control unit is added with the command unit and the drive control units intact, whereby the number of axes to which synchronization error correction can be made can be increased and by extension it is easily made possible to make the system highly accurate.

The detection data of the sensor can be reflected on the servo control within one communication period, machine vibration can be suppressed, and the positioning accuracy can be improved. At this time, the drive control units can receive the detection data of the sensor almost at the same time via the sensor control unit and the upward communication line, so that the suppression effect of the machine vibration and the positioning accuracy are not degraded. In this connection, if the sensor control unit is not provided, the detection data of the sensor needs to be sent via one drive control unit to the other and thus each drive control unit receives the detection data of the sensor with a delay and by extension the effect of feedback compensation using the detection data of the sensor is weakened.

Since the drive control unit can directly input the detection data of the sensor not via the command unit, it is made possible to stop the system without any delay caused by the intervention of any other unit at the emergency time at which the table exceeds the moving range, for example.

Further, the need for providing the drive control unit with dedicated connectors for receiving the data of the sensors of the acceleration sensor, the limit switches, etc., is eliminated and by extension a general-purpose unit can be used as the drive control unit.

In the invention, in the above-mentioned servomotor drive control system, the communication period between the above-mentioned motion control unit, the above-mentioned drive control units, and the above-mentioned sensor control unit is set to one-nth of the communication period of the above-mentioned command unit (n is an integer). Thus, the detection data of the sensor can be acquired independently of the control period of the command unit, so that the suppression frequency of machine resonance can be raised and highly responsive machine positioning is made possible.

Since the drive control unit can directly input the detection data of the sensor not via the command unit and moreover can acquire the detection data independently of the control period of the command unit, it is made possible to stop the system without any delay caused by the intervention of any other unit at the emergency time at which the table exceeds the moving range, for example.

Further, the synchronization error correction control command transmitted by the motion control unit is not bound by the control period of the command unit and it is made possible to suppress the synchronization error amount caused by a disturbance like an impulse in a shorter time.

According to the invention, in the servomotor drive control system comprising a command unit of a numerical control unit, etc., a plurality of drive control units for controlling drive of servomotors, a first communication line for transmitting data of a control command, etc., in a direction of the above-mentioned plurality of drive control units from the above-mentioned command unit, and a second communication line for transmitting data of detection data, etc., in a direction of the above-mentioned command unit from the above-mentioned plurality of drive control units, wherein the above-mentioned plurality of drive control units synchronously control the servomotors, a motion control unit is placed between the above-mentioned command unit and the above-mentioned plurality of drive control units, the above-mentioned first and second communication lines can be disconnected in the above-mentioned motion control unit, with the above-mentioned first and second communication lines disconnected in the above-mentioned motion control unit, the above-mentioned motion control unit receives the control command for a plurality of periods given to the above-mentioned plurality of drive control units, transmitted through the above-mentioned first communication line from the above-mentioned command unit in the communication period defined by the above-mentioned command unit, divides the received control command into a plurality of pieces, transmits the provided control command pieces to the above-mentioned plurality of drive control units through the above-mentioned first communication line in one-nth (n is an integer) of the communication period defined by the above-mentioned command unit, receives the detection data transmitted through the above-mentioned second communication line in one-nth (n is an integer) of the communication period defined by the above-mentioned command unit from the above-mentioned plurality of drive control units, generates a synchronization error correction control command based on the received detection data and the received control command from the above-mentioned command unit, transmits the synchronization error correction control command to the above-mentioned drive control units through the above-mentioned first communication line in one-nth (n is an integer) of the communication period defined by the above-mentioned command unit, and transmits the received data of the detection data, etc., transmitted from the above-mentioned plurality of drive control units to the above-mentioned command unit through the above-mentioned second communication line in the communication period defined by the above-mentioned command unit, and the above-mentioned drive control units receive the control command and the synchronization error correction control command transmitted through the above-mentioned first communication line in one-nth (n is an integer) of the communication period defined by the above-mentioned command unit and control the servomotors based on the received control command and synchronization error correction control command. Thus, the communication lines connected to the command unit can be used only to transfer data between the command unit at low communication speed and the motion control unit, and the communication lines connected to the drive control units, etc., at high communication speed can be used only to transfer data between the motion control unit and the drive control units and therefore the transmission efficiency of the communication lines can be improved.

The motion control unit generates the synchronization error correction control command, whereby the calculation load on the command unit for preparing the synchronization error or the control processing load on the drive control unit for correcting the synchronization error can be reduced.

To increase the number of axes that can be controlled, a drive control unit having the same configuration as the drive control unit is added with the command unit and the drive control units intact, whereby the number of axes to which synchronization error correction can be made can be increased and by extension it is easily made possible to make the system highly accurate.

Further, the synchronization error correction control command transmitted by the motion control unit is not bound by the control period of the command unit and it is made possible to suppress the synchronization error amount caused by a disturbance like an impulse in a short time.

Further, according to the invention, in the servomotor drive control system comprising a command unit of a numerical control unit, etc., a plurality of drive control units for controlling drive of servomotors, a first communication line for transmitting data of a control command, etc., in a direction of the above-mentioned plurality of drive control units from the above-mentioned command unit, and a second communication line for transmitting data of detection data, etc., in a direction of the above-mentioned command unit from the above-mentioned plurality of drive control units, wherein the above-mentioned plurality of drive control units synchronously control the servomotors, a motion control unit is placed between the above-mentioned command unit and the above-mentioned plurality of drive control units, a sensor control unit is provided for inputting detection data of a sensor and transmitting the data directly to the above-mentioned drive control unit through the above-mentioned first or second communication line, the above-mentioned first and second communication lines can be disconnected in the above-mentioned motion control unit, with the above-mentioned first and second communication lines disconnected in the above-mentioned motion control unit, the above-mentioned motion control unit receives the control command for a plurality of periods given to the above-mentioned plurality of drive control units, transmitted through the above-mentioned first communication line from the above-mentioned command unit in the communication period defined by the above-mentioned command unit, divides the received control command into a plurality of pieces, transmits the provided control command pieces to the above-mentioned plurality of drive control units through the above-mentioned first communication line in one-nth (n is an integer) of the communication period defined by the above-mentioned command unit, receives the detection data transmitted through the above-mentioned second communication line in one-nth (n is an integer) of the communication period defined by the above-mentioned command unit from the above-mentioned plurality of drive control units, generates a synchronization error correction control command based on the received detection data and the received control command from the above-mentioned command unit, transmits the synchronization error correction control command to the above-mentioned drive control units through the above-mentioned first communication line in one-nth (n is an integer) of the communication period defined by the above-mentioned command unit, and transmits the received data of the detection data, etc., transmitted from the above-mentioned plurality of drive control units to the above-mentioned command unit through the above-mentioned second communication line in the communication period defined by the above-mentioned command unit, and the above-mentioned plurality of drive control units receive the control command and the synchronization error correction control command transmitted through the above-mentioned first communication line in one-nth (n is an integer) of the communication period defined by the above-mentioned command unit, receives the detection data of the sensor transmitted through the above-mentioned first or second communication line in one-nth (n is an integer) of the communication period defined by the above-mentioned command unit, and control the servomotors based on the received control command, synchronization error correction control command, and detection data of the sensor. Thus, the communication lines connected to the command unit can be used only to transfer data between the command unit at low communication speed and the motion control unit, and the communication lines connected to the drive control units, etc., at high communication speed can be used only to transfer data between the motion control unit, the drive control units, and the sensor control unit and therefore the transmission efficiency of the communication lines can be improved.

The motion control unit generates the synchronization error correction control command, whereby the calculation load on the command unit for preparing the synchronization error or the control processing load on the drive control unit for correcting the synchronization error can be reduced.

To increase the number of axes that can be controlled, a drive control unit having the same configuration as the drive control unit is added with the command unit and the drive control units intact, whereby the number of axes to which synchronization error correction can be made can be increased and by extension it is easily made possible to make the system highly accurate.

The synchronization error correction control command transmitted by the motion control unit is not bound by the control period of the command unit and it is made possible to suppress the synchronization error amount caused by a disturbance like an impulse in a short time.

The detection data of the sensor can be acquired independently of the control period of the command unit, so that the suppression frequency of machine resonance can be raised and highly responsive machine positioning is made possible.

Since the drive control unit can directly input the detection data of the sensor not via the command unit and moreover can acquire the detection data independently of the control period of the command unit, it is made possible to stop the system without any delay caused by the intervention of any other unit at the emergency time at which the table exceeds the moving range, for example.

Further, the need for providing the drive control unit with dedicated connectors for receiving the data of the sensors of the acceleration sensor, the limit switches, etc., is eliminated and by extension a general-purpose unit can be used as the drive control unit.

Industrial Applicability

As described above, the servomotor drive control system according to the invention is suited for use in a numerical control system for synchronously operating two or more axes, a numerical control system for inputting sensor information and controlling servomotors, etc.

What is claim is:

1. A servomotor drive control system comprising:
    a command unit such as a numerical control unit,
    a plurality of drive control units for controlling drive of servomotors,
    a first communication line for transmitting data such as a control command, in a direction of said plurality of drive control units from said command unit, and
    a second communication line for transmitting data such as detection data, in a direction of said command unit from said plurality of drive control units, wherein
        said plurality of drive control units synchronously control said servomotors, and
        a motion control unit is placed between said command unit and said plurality of drive control units for receiving the control command given to said plurality of drive control units, transmitted through said first communication line from said command unit, receiving the detection data transmitted through said second communication line from said plurality of drive control units, generating a synchronization error correction control command based on the received control command and detection data, and transmitting the generated synchronization error correction control command to said drive control units through said first communication line, and
        said drive control units receive the control command from said command unit and the synchronization error correction control command from said motion control unit, transmitted through said first communication line and control said servomotors based on the received control command and synchronization error correction control command.

2. The servomotor drive control system as claimed in claim 1, wherein
    a communication period between said motion control unit and said drive control units is set to one-nth of a communication period of said command unit (n is an integer).

3. A servomotor drive control system comprising:
    a command unit such as a numerical control unit,
    a plurality of drive control units for controlling drive of a servomotor,
    a first communication line for transmitting data such as a control command, in a direction of said plurality of drive control units from said command unit, and
    a second communication line for transmitting data such as detection data, in a direction of said command unit from said plurality of drive control units, wherein
        a sensor control unit for inputting detection data of a sensor and transmitting the data directly to said plurality of drive control units through said first or second communication line, and
        said plurality of drive control units receives the control command from said command unit transmitted through said first communication line and the detection data of the sensor transmitted through said first or second communication line, and controls said servomotor based on the received control command and detection data of the sensor.

4. The servomotor drive control system as claimed in claim 3, wherein
    a communication period between said drive control unit and said sensor control unit is set to one-nth of a communication period of said command unit (n is an integer).

5. A servomotor drive control system comprising:
    a command unit such as a numerical control unit,
    a plurality of drive control units for controlling drive of servomotors,
    a first communication line for transmitting data such as a control command, in a direction of said plurality of drive control units from said command unit, and
    a second communication line for transmitting data such as detection data, in a direction of said command unit from said plurality of drive control units, wherein
        said plurality of drive control units synchronously control said servomotors,
        a sensor control unit is provided for inputting detection data of a sensor and transmitting the data directly to said drive control units through said first or second communication line, and
        a motion control unit is placed between said command unit and said plurality of drive control units for receiving the control command given to said plurality of drive control units, transmitted through said first communication line from said command unit, receiving the detection data transmitted through said second communication line from said plurality of drive control units, generating a synchronization error correction control command based on the received control command and detection data mentioned above, and transmitting the generated synchronization error correction control command to said drive control units through said first communication line, and
        said drive control units receive the control command from said command unit transmitted through said first communication line, the synchronization error correction control command from said motion control unit transmitted through said first communication line, and the detection data of the sensor transmitted through said first or second communication line, and control said servomotors based on the received control command, synchronization error correction control command, and detection data of the sensor.

6. The servomotor drive control system as claimed in claim 5, wherein a communication period between said motion control unit, said drive control units, and said sensor control unit is set to one-nth of a communication period of said command unit.

7. A servomotor drive control system comprising:

a command unit such as a numerical control unit, a plurality of drive control units for controlling drive of servomotors, a first communication line for transmitting data such as a control command, in a direction of said plurality of drive control units from said command unit, and a second communication line for transmitting data such as detection data, in a direction of said command unit from said plurality of drive control units, wherein said plurality of drive control units synchronously control said servomotors, a motion control unit is placed between said command unit and said plurality of drive control units, and said first and second communication lines are capable to be disconnected in said motion control unit, with said first and second communication lines disconnected in said motion control unit, said motion control unit receives the control command for a plurality of periods given to said plurality of drive control units, transmitted through said first communication line from said command unit in a communication period defined by said command unit, divides the received control command into a plurality of pieces, transmits the provided control command pieces to said plurality of drive control units through said first communication line in one-nth of the communication period defined by said command unit, receives the detection data transmitted through said second communication line in one-nth of the communication period defined by said command unit from said plurality of drive control units, generates a synchronization error correction control command based on the received detection data and the received control command from said command unit, transmits the synchronization error correction control command to said drive control units through said first communication line in one-nth of the communication period defined by said command unit, and transmits the received data such as the detection data, transmitted from said plurality of drive control units to said command unit through said second communication line in the communication period defined by said command unit, and said drive control units receive the control command and the synchronization error correction control command transmitted through said first communication line in one-nth of the communication period defined by said command unit and control said servomotors based on the received control command and synchronization error correction control command.

8. A servomotor drive control system comprising:

a command unit such as a numerical control unit, a plurality of drive control units for controlling drive of servomotors, a first communication line for transmitting data such as a control command, in a direction of said plurality of drive control units from said command unit, and a second communication line for transmitting data such as detection data, in a direction of said command unit from said plurality of drive control units, wherein said plurality of drive control units synchronously control said servomotors, a motion control unit is placed between said command unit and said plurality of drive control units and a sensor control unit for inputting detection data of a sensor and transmitting the data directly to said drive control unit through said first or second communication line, and said first and second communication lines are capable to be disconnected in said motion control unit, with said first and second communication lines disconnected in said motion control unit, said motion control unit receives the control command for a plurality of periods given to said plurality of drive control units, transmitted through said first communication line from said command unit in a communication period defined by said command unit, divides the received control command into a plurality of pieces, transmits the provided control command pieces to said plurality of drive control units through said first communication line in one-nth of the communication period defined by said command unit, receives the detection data transmitted through said second communication line in one-nth of the communication period defined by said command unit from said plurality of drive control units, generates a synchronization error correction control command based on the received detection data and the received control command from said command unit, transmits the synchronization error correction control command to said drive control units through said first communication line in one-nth of the communication period defined by said command unit, and transmits the received data such as the detection data, transmitted from said plurality of drive control units to said command unit through said second communication line in the communication period defined by said command unit, and said plurality of drive control units receive the control command and the synchronization error correction control command transmitted through said first communication line in one-nth of the communication period defined by said command unit, receives the detection data of the sensor transmitted through said first or second communication line in one-nth of the communication period defined by said command unit, and control said servomotors based on the received control command, synchronization error correction control command, and detection data of the sensor.

* * * * *